(12) United States Patent
Kobayashi et al.

(10) Patent No.: US 7,385,635 B2
(45) Date of Patent: Jun. 10, 2008

(54) ELECTRONIC IMAGE PROCESSING DEVICE AND SYSTEM FOR IMAGE DATA TRANSFER OPERATION

(75) Inventors: Toshiaki Kobayashi, Nishishirakawa-gun (JP); Satoshi Ejima, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 855 days.

(21) Appl. No.: 10/125,420

(22) Filed: Apr. 19, 2002

(65) Prior Publication Data

US 2002/0191079 A1 Dec. 19, 2002

(30) Foreign Application Priority Data

| Apr. 24, 2001 | (JP) | ............................. 2001-126497 |
| Apr. 24, 2001 | (JP) | ............................. 2001-126500 |

(51) Int. Cl.
*H04N 5/76* (2006.01)
(52) U.S. Cl. .............................. 348/231.99; 348/231.3; 348/231.9; 348/222.1
(58) Field of Classification Search ........... 348/231.99, 348/207.99, 222.1, 372, 231.2–3, 231.9; 386/117
See application file for complete search history.

(56) References Cited

U.S. PATENT DOCUMENTS

| 6,167,469 | A | * | 12/2000 | Safai et al. | .................... 710/62 |
| 6,346,937 | B1 | * | 2/2002 | Sasaki et al. | ................ 348/372 |
| 6,396,518 | B1 | * | 5/2002 | Dow et al. | ................... 715/772 |
| 6,630,954 | B1 | * | 10/2003 | Okada | ...................... 348/231.7 |
| 6,668,134 | B1 | * | 12/2003 | Niikawa | .................. 348/231.1 |
| 6,710,809 | B1 | * | 3/2004 | Niikawa | ...................... 348/372 |
| 6,784,924 | B2 | * | 8/2004 | Ward et al. | .............. 348/207.1 |
| 7,110,037 | B2 | * | 9/2006 | Ojima | ......................... 348/372 |
| 2001/0020977 | A1 | * | 9/2001 | Watanabe | .................... 348/222 |
| 2003/0210898 | A1 | * | 11/2003 | Juen et al. | ................... 386/117 |
| 2004/0169730 | A1 | * | 9/2004 | Tamura et al. | .............. 348/375 |
| 2006/0238619 | A1 | * | 10/2006 | Takahashi | ................ 348/207.1 |

FOREIGN PATENT DOCUMENTS

JP A-6-350886 12/1994

* cited by examiner

*Primary Examiner*—Lin Ye
*Assistant Examiner*—Gevell Selby
(74) *Attorney, Agent, or Firm*—Oliff & Berridge, PLC

(57) ABSTRACT

An electronic device comprises an image-capturing device that captures an image of a subject, a recording device that records image files of images captured by the image-capturing device into a recording medium, a specifying information forming device that forms image specifying information for specifying an image file in the recording medium separately from the image files, a communication device that transfers image files recorded in the recording medium to an external recording device, a transfer instruction operation unit that issues an instruction for the communication device to transfer the image file specified in the image specifying information and a processing device that processes the image files differently depending upon whether or not image specifying information has been formed in the recording medium with respect to the recorded image files.

29 Claims, 20 Drawing Sheets

(REPRODUCED SINGLE FRAME IMAGE DISPLAY)

(REPRODUCED THUMBNAIL IMAGE DISPLAY)

(REPRODUCED SINGLE-FRAME IMAGE DISPLAY)

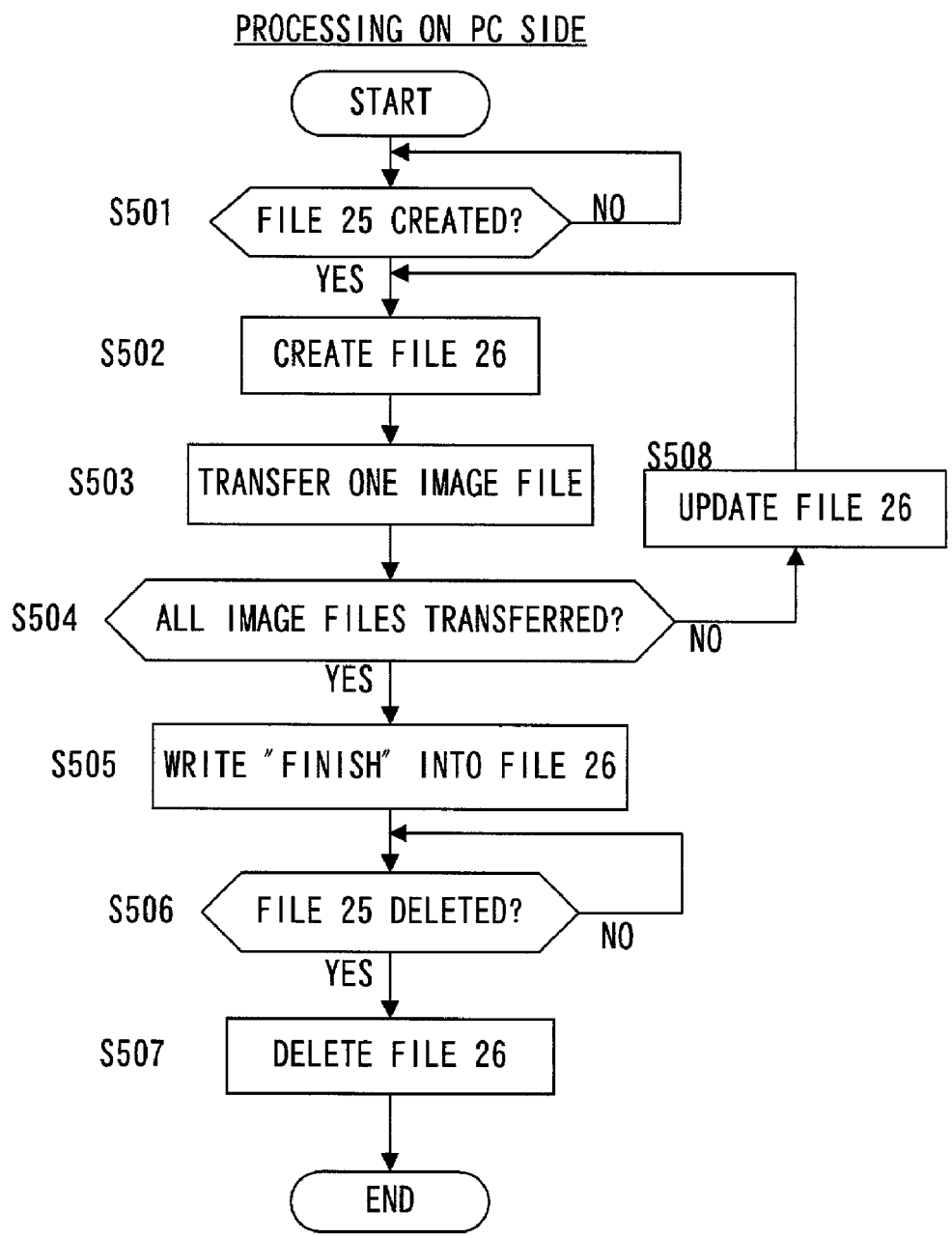

ELECTRONIC IMAGE PROCESSING DEVICE AND SYSTEM FOR IMAGE DATA TRANSFER OPERATION

INCORPORATION BY REFERENCE

The disclosures of the following priority applications are herein incorporated by reference:
Japanese Patent Application No. 2001-126497 filed Apr. 24, 2001
Japanese Patent Application No. 2001-126500 filed Apr. 24, 2001

BACKGROUND OF THE INVENTION

1. Field of the Invention

The present invention relates to an electronic device and an electronic system that includes an electronic device.

2. Description of the Related Art

In an electronic camera such as a digital still camera, data of a photographed image are recorded in a memory internally provided in the camera or in a recording medium such as a memory card mounted at the camera. Following the photographing operation, the image data may be transferred to a recording device such as a personal computer or the like via a communication cable. There is a technology in the related art that allows specific images to be saved for later use by attaching a transfer marking to the images to be saved during the photographing operation or an image reproduction operation and transferring in a batch only the images having the transfer marking attached thereto to the PC side. After the transfer, the image data having been recorded in the recording medium are erased so that new image data can be recorded in the recording medium. In addition, since a recording medium mounted at an electronic camera has a limited recording capacity, unnecessary image data, i.e., image data with no transfer marking attached thereto, are normally erased from the recording medium to allow image data obtained through a subsequent photographing operation to be recorded into the recording medium.

However, there is a possibility of the image data with the transfer marking attached thereto, i.e., the image data that the user wishes to save, being erased by mistake while erasing unnecessary image data in the electronic camera in the related art.

SUMMARY OF THE INVENTION

An object of the present invention is to provide an electronic device and an electronic system capable of performing different processing depending upon whether or not image data are to be transferred so that, for instance, image data to be transferred are prevented from being deleted by mistake.

An electronic device according to the present invention comprises an image-capturing device that captures an image of a subject, a recording device that records image files corresponding to images captured by the image-capturing device into a recording medium, a specifying information forming device that forms image specifying information for specifying an image file in the recording medium separately from the image files, a communication device used to transfer image files recorded in the recording medium to an external recording device, a transfer instruction operation unit that issues an instruction for the communication device to transfer the image file specified in the image specifying information and a processing device that processes the image files differently depending upon whether or not image specifying information is formed in the recording medium with respect to the recorded image file.

In this electronic device, the processing executed by the processing device is deletion of image files recorded in the recording medium and the processing device deletes only image files that are not specified with the image specifying information.

The electronic device according to the present invention may further comprise a specifying information deleting device that deletes the image specifying information from the recording medium after the communication device transfers image files specified with the image specifying information.

Alternatively, an electronic device according to the present invention comprises an image-capturing device that captures an image of a subject, a recording device that records image files of images captured by the image-capturing device into a recording medium, a specifying information forming device that forms image specifying information for specifying an image file as tag information in the image file, a communication device that transfers image files recorded in the recording medium to an external recording device, a transfer instruction operation unit that issues an instruction for the communication device to transfer the image file specified in the image specifying information and a processing device that performs different processing on image files depending upon whether or not the image specifying information has been formed in the image files.

In this electronic device, the processing executed by the processing device is deletion of image files recorded in the recording medium and the processing device deletes only image files that are not specified with the image specifying information.

The electronic device according to the present invention may further comprise a specifying information deleting device that deletes the tag information from image files specified with the image specifying information after the communication device transfers the image files. It may further include an image reproducing device that reproduces photographic images based upon an image file recorded in the recording medium, and in this case, the specifying information forming device forms image specifying information for the image file corresponding to each photographic images reproduced by the image reproducing device. The specifying information forming device forms the image specifying information for the image file during a period of time elapsing between the image capturing operation executed by the image-capturing device and the completion of the recording of the image file into the recording medium.

The electronic device according to the present invention may include a display device that displays a mark indicating a transfer end once an image data transfer is completed. It may include a display device that displays a mark indicating that the power to the electronic device can now be turned off once the image data transfer is completed, instead.

An electronic system according to the present invention includes the electronic device described earlier and an external recording device to which the image files recorded in the recording medium of the electronic device are transferred, and in this electronic system, an image file transfer to the external recording device from the recording medium starts in response to an instruction issued through the transfer instruction operation unit.

An electronic device according to the present invention may comprise an image-capturing device that captures an image of a subject, a recording device that records image data constituting images captured by the image-capturing device into a recording medium, a communication device that transfers the image data recorded in the recording medium to an external recording device, a transfer instruction operation unit that issues an instruction for the communication device to transfer the image data and a display device that displays a mark indicating a transfer end once the image data transfer is completed.

An electronic device according to the present invention may comprise an image-capturing device that captures an image of a subject, a recording device that records image data constituting images captured by the image-capturing device into a recording medium, a communication device that transfers the image data recorded in the recording medium to an external recording device, a transfer instruction operation unit that issues an instruction for transferring the image data by engaging the communication device and a display device that displays a mark indicating that the power to the electronic device can now be turned off once the image data transfer is completed, instead.

This electronic device is provided with an internal drive battery.

In addition, the electronic device should include an external power connector terminal that can be connected with an external power source, a judging device that judges as to whether or not the external power source is connected to the external power connector terminal and a control device that allows the mark to be displayed at the display device if the judging device judges that the external power source is not connected and disallows a display of the mark at the display device if the judging device judges that the external power source is connected.

The power to the electronic device may be turned off when a predetermined length of time elapses following the end of the image data transfer.

In an electronic system according to the present invention that comprises; (a) an external recording device having an information input device, (b) an electronic device having an image-capturing device that captures an image of a subject, a recording device that records image data corresponding to images captured by the image-capturing device into a recording medium, an information output device capable of outputting to the outside the image data recorded in the recording medium and a transfer instruction operation unit that issues an instruction for transferring the image data via the information output device and is capable of assuming a low power consumption mode and (c) a transmission device that transmits the image data from the information output device to the information input device, the image data transfer from the electronic device to the external recording device via the transmission device is started in response to an instruction issued through the transfer instruction operation unit and the electronic device is set in the low power consumption mode in response to an instruction issued from the external recording device via the transmission device when the transfer is completed.

BRIEF DESCRIPTION OF THE DRAWINGS

FIG. 17 presents a flowchart of the procedure of the processing executed on the PC side in the third embodiment;

DETAILED DESCRIPTION OF THE PREFERRED EMBODIMENTS

First Embodiment

Figure 1A:
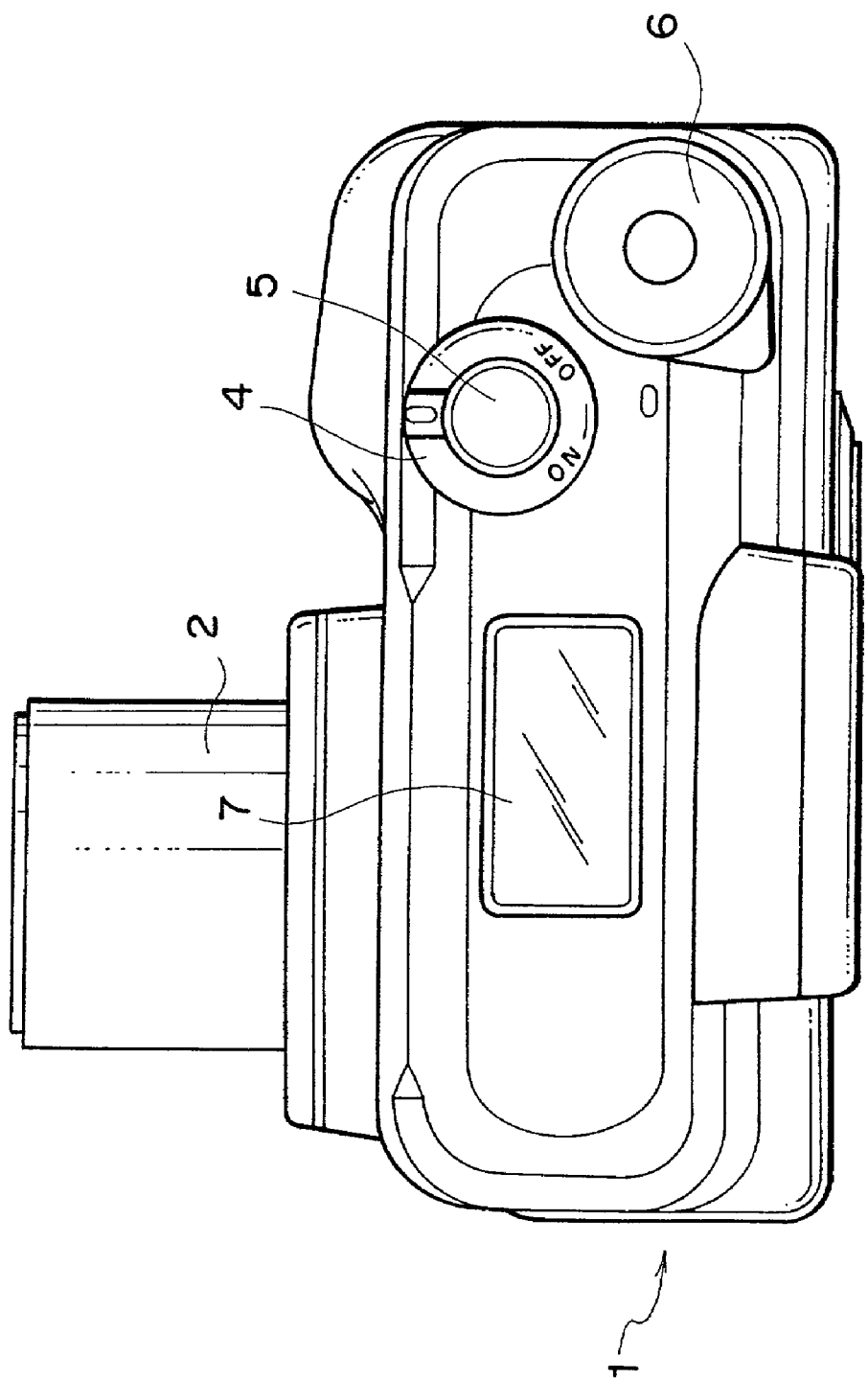
FIGS. 1A and 1B illustrate an embodiment of the electronic device according to the present invention, with FIG. 1A presenting a plan view of the electronic camera and FIG. 1B presenting a rear view of the camera.
Figure 1B:
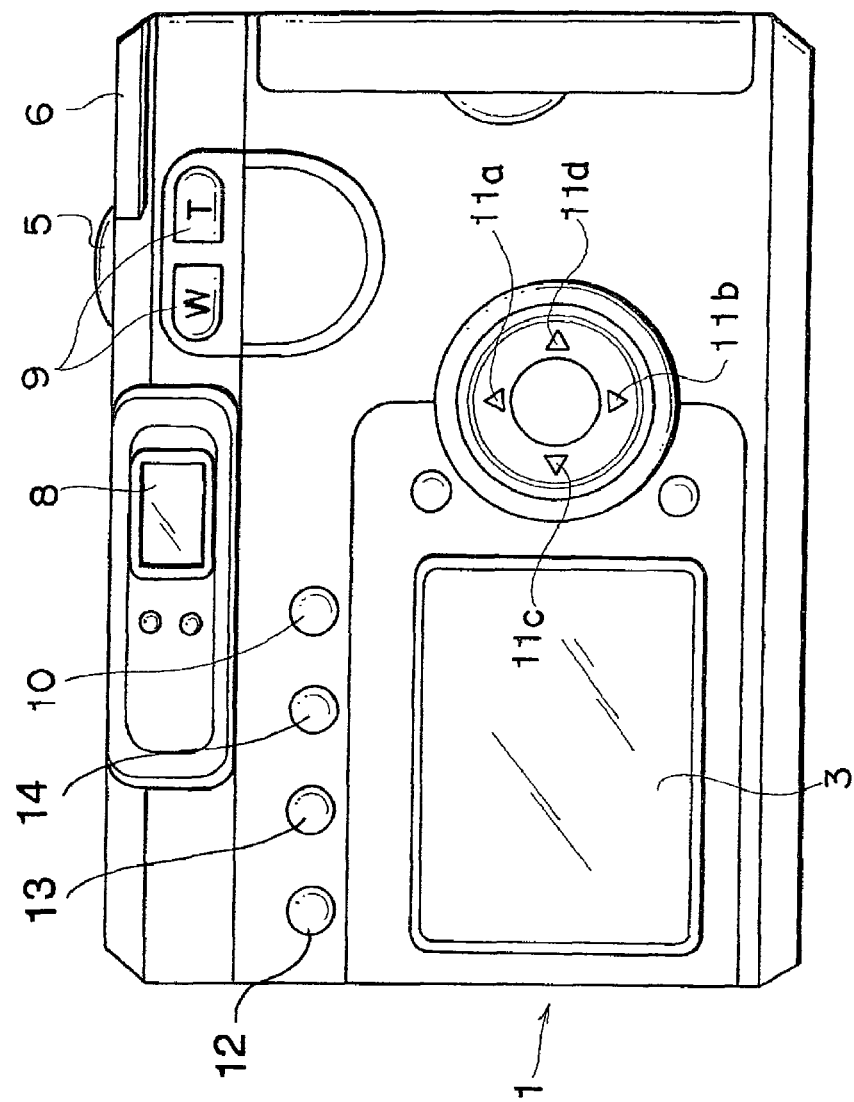

The following is an explanation of the first embodiment of the electronic device and the electronic system according to the present invention, given in reference to the drawings. FIGS. 1A and 1B illustrate the electronic device achieved in the first embodiment. FIG. 1A is a plan view of an electronic camera 1 and FIG. 1B is a rear view of the electronic camera 1. As shown in FIG. 1A, at the upper surface of the electronic camera 1, a main switch 4 through which the power is turned on/off, a shutter release button 5 through which a photographing operation is executed and a display panel 7 at which camera information is displayed are provided.

The electronic camera 1 assumes a recording mode in which image data obtained by photographing a subject are recorded into a memory card 424 to be detailed later and a reproduction mode in which the image data recorded in the memory card 424 are read out and the image data thus read out are reproduced and displayed at a display LCD 3 (see FIG. 1B) provided at the rear surface of the camera. Either the recording mode or the reproduction mode is selected through a dial 6. When the recording mode is selected, subject images captured by a CCD 214 which is to be detailed later are sequentially displayed at the display LCD 3. When the reproduction mode is selected, on the other hand, thumbnail display of images recorded in the memory card 424 to be explained later or display of individual reproduced images is brought up on the display LCD 3.

As shown in FIG. 1B, a viewfinder eyepiece window 8, zoom switching buttons 9 which are operated to engage a photographic optical system 2 in a zoom operation and various operating buttons are provided at the camera rear surface in addition to the display LCD 3 that is utilized for image display. If the W-side button of the zoom switching buttons 9 in FIG. 1B is pressed, the photographic optical system 2 is driven to the wide angle side, whereas if the T-side button is pressed, the photographic optical system 2 is driven to the telephoto side.

A menu button 10 is operated to display a setting menu at the display LCD 3. The operator brings up a setting menu at the display LCD 3 by pressing the menu button 10 in order to make various settings and then selects the items to be set through selector buttons 11a~11d. A transfer marking can be set and cleared in the recording mode, the transfer marking can be set and cleared in a batch in the reproduction mode and a re-transfer can be set, for instance, in the setting menu in the embodiment. Details of the individual settings are to be detailed later.

A transfer marking button 12 is an operating push-button which is operated when individually appending the transfer marking to image files. A transfer button 13 is pushed to start an image file transfer. A delete button 14 is operated to delete image files recorded in the memory card 424 (see FIG. 2). It is to be noted that the transfer marking button 12 is also operated to clear the transfer marking as detailed later.

Figure 2:
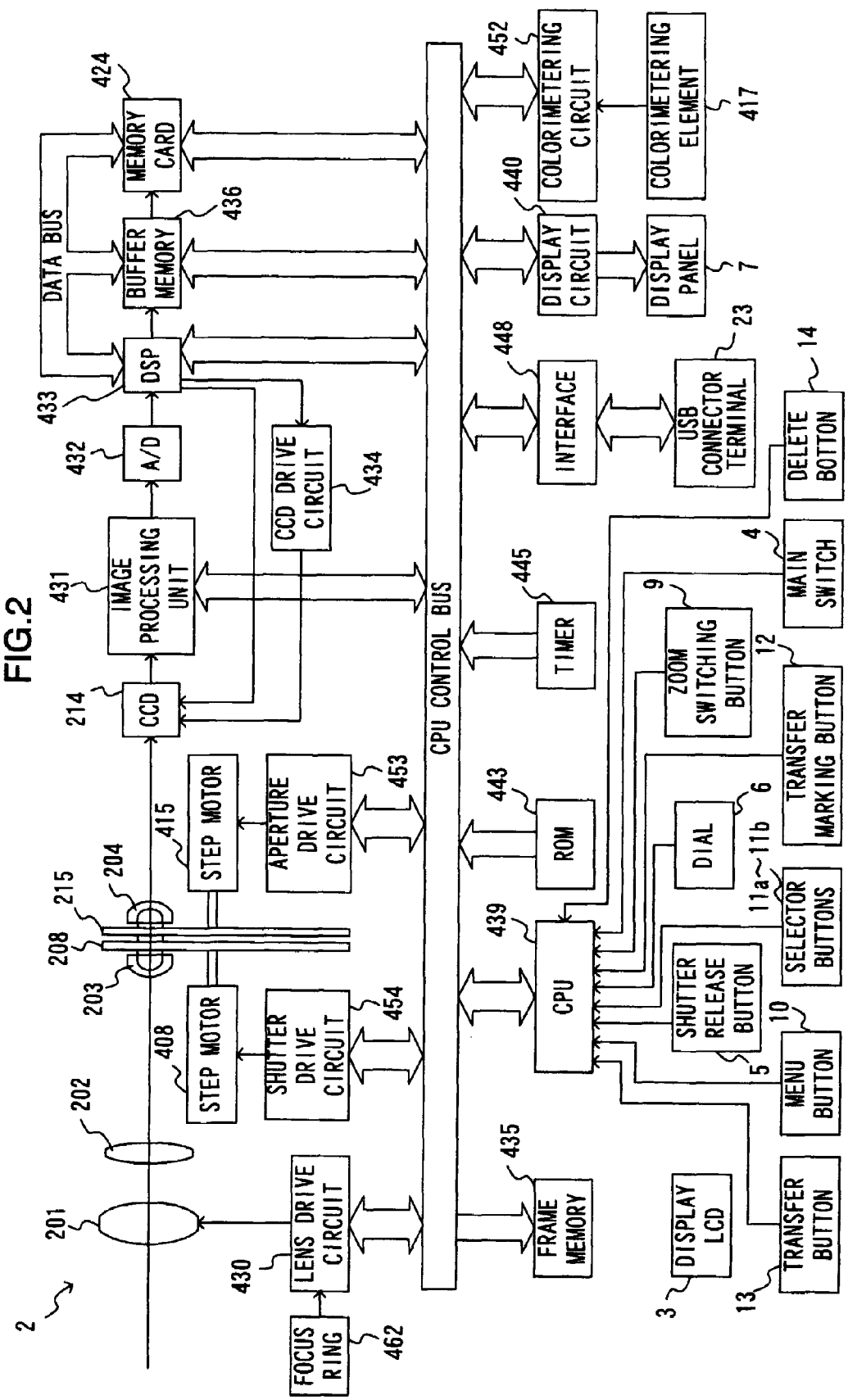
FIG. 2 is a circuit block diagram of the electronic camera shown in FIG. 1.

FIG. 2 is a circuit block diagram of the electronic camera shown in FIG. 1A. Control program used in the electronic camera 1 is stored in a ROM 443. When the main switch 4 is turned on, the power to the electronic camera 1 is turned on and the control program stored in the ROM 443 is started up by a CPU 439. The electronic camera 1 enters a photographing enabled state when the recording mode is set through an operation of the dial 6 after the control program is started up. If, on the other hand, the reproduction mode is set through an operation of the dial 6, an image is reproduced and displayed at the display LCD 3 based upon image data recorded in the memory card 424, which is the recording medium. It is to be noted that image constituted of image capturing signals transmitted from the CCD 214 is displayed at the display LCD 3 in the recording mode.

The photographic optical system 2 includes a plurality of lenses 201~204. A focal adjustment operation to adjust the focus of the lens 201 is executed by a lens drive circuit 430. While the focal adjustment operation by the lens drive circuit 430 is normally executed in response to a command issued by the CPU 439, a focal adjustment operation may be instead performed based upon an operation signal which is output when a zoom ring 462 is manually operated.

A shutter plate 208 and an aperture 215 are provided between the lens 203 and the lens 204 in the photographic optical system 2. Subject light having entered the photographic optical system 2 passes through the lenses 201~204, the shutter plate 208 and the aperture plate 215 and forms an image on the image capturing surface of the CCD 214. The aperture plate 215 and the shutter plate 208, which are each formed in a disk shape, are respectively driven by step motors 415 and 408 provided at the centers of rotation at the disks. At the aperture plate 215, a plurality of aperture openings (not shown) with varying opening areas are provided. The step motor 415 rotates the aperture plate 215 to set a given aperture opening among the plurality of aperture openings on the optical axis.

The shutter plate 208 includes a full light blocking portion (not shown) that blocks the entire light flux having passed through the lens 203 and an opening (not shown) that allows the entire light flux to pass through. During an exposure operation, the opening at the shutter plate 208 is set on the optical path, and the full light blocking portion is set on the optical path when the exposure operation ends. The drive of the step motor 415, which rotates the aperture plate 215 is controlled by a drive circuit 453. The drive of the step motor 408, which rotates the shutter plate 208 is controlled by a shutter drive circuit 454.

During a photographing operation, the electrical charges stored at the CCD 214 are first cleared and a specific opening at the aperture plate 215 is set on the optical path. Then, electrical charges are stored at the CCD 214 again as an exposure operation is performed at the CCD 214 over a specific length of time. The length of time elapsing from the clearance of the electrical charges mentioned above until the optical path becomes shielded from light by the full light blocking portion of the shutter plate 208 again is equivalent to the exposure period.

When a subject image is formed on the image capturing surface of the CCD 214 by the photographic optical system 2, signal charges corresponding to the intensity of the light from the subject image are stored. A horizontal drive signal is provided to the CCD 214 from a digital signal processor (hereafter referred to as a DSP) 433 and also a vertical drive signal is provided to the CCD 214 from a CCD drive circuit 434 which is controlled by the DSP 433. Namely, the operational timing of the CCD 214 is controlled by the DSP 433 and the CCD drive circuit 434. Signals output from CCD 214 are input to an image processing unit 431.

The image processing unit 431, which includes a noise removal circuit, a DC reproducing circuit and the like, implements analog processing such as noise removal and gain control on the image signals output from the CCD 214. The analog image signals output from the image processing unit 431 are converted to digital signals at an analog/digital conversion circuit (hereafter referred to as an A/D conversion circuit) 432. The digital image data resulting from the conversion are input to the DSP 433 mentioned earlier.

The DSP 433 implements image processing such as outline compensation, gamma correction and white balance adjustment on the image data output from the A/D conversion circuit 432. In addition, the DSP 433 first stores the image data having undergone the various types of image processing into a buffer memory 436, reads out the image data from the buffer memory 436, compresses the image data in a specific compression format (e.g., JPEG) and records the compressed data into the memory card 424, by controlling a data bus connected with the buffer memory 436 and the memory card 424.

The DSP 433 stores the image data obtained by implementing the image processing described above on the data of the image captured by the CCD 214 and image data obtained by decompressing the image data read out from the memory card 424 into a frame memory 435 and displays images based upon these image data at the display LCD 3 provided in the electronic camera 1. In addition, the DSP 433 controls the timing of the data input/output when recording the image data into the memory card 424, recording decompressed photographic image data into the buffer memory 436 and the like.

The buffer memory 436, where the image data prepared based upon the output of the CCD 214 are temporarily stored, is utilized to lessen the extent of inconsistency in the speed with which the image data are input to/output from the memory card 424 and also to reduce the difference between the processing speed at the CPU 439 and the processing speed at the DSP 433. A timer 445, which is internally provided with a clock circuit, outputs time data indicating the current time point to the CPU 439 and is also utilized as a timer during monitor on/off control which is to be detailed later. The time data are recorded together with the image data into the memory card 424.

A colorimetering element 417 detects the color temperature of a main subject and the color temperature in the vicinity of the main subject, and outputs data indicating the detected color temperatures to a colorimetering circuit 452. The colorimetering circuit 452 implements a specific type of processing on analog signals output from the colorimetering element 417 to convert them to digital values and outputs the digital signals resulting from the conversion to the CPU 439. An interface 448 is provided to enable data exchange with a specific external device (not shown). The interface 448 is constituted of a USB interface in the embodiment. A USB communication cable can be connected to a USB connector terminal 23. A display circuit 440 controls the display panel 7.

(Operation Performed in the Recording Mode)

Now, a brief explanation is given on the operation performed in the recording mode. In the recording mode, subject images captured by the CCD 214 are sequentially displayed as through images at the display LCD 3 even when the shutter release button 5 is not operated. Namely, image signals output from the CCD 214 first undergo analog processing such as noise removal and gain correction at the image processing unit 431 and then are converted to digital signals at the A/D conversion circuit 432. The digitized signals are then provided to the DSP 433 where they undergo image preprocessing such as outline compensation and gamma correction before they are temporarily stored into the buffer memory 436.

Subsequently, the digital signals having undergone white balance adjustment are processed to prepare image data for display at the display LCD 3. The processed image data are written into the frame memory 435 and are displayed at the display LCD 3 as a photographic monitor image which is also referred to as a through image. The through image is sequentially updated over predetermined time intervals based upon the subject light entering the photographic optical system 2 through repeated execution of the operation described above.

When a halfway press switch (not shown) is turned on by pressing the shutter release button 5 halfway down, the focal adjustment state of the photographic optical system 2 is detected based upon the contrast in the image data and a focal adjustment operation is executed so as to form a focused subject image on the CCD 214. This focal adjustment operation is executed by the lens drive circuit 430 as explained earlier. In addition, as the shutter release button 5 is pressed halfway down, the CPU 439 detects the brightness of the subject based upon the image data and performs an exposure calculation in conformance to the detected brightness level.

When the shutter release button 5 is pressed all the way down after it is pressed halfway down, a full press switch (not shown) becomes turned on. As a result, the signal charges stored at the CCD 214 are first cleared and then the shutter plate 208 and the aperture plate 215 are driven based upon the results of the exposure calculation to allow the CCD 214 to engage in an image capturing operation.

The image signals output from the CCD 214 through this image capturing operation first undergo the series of processing described earlier and then are stored in the buffer memory 436. The image data stored in the buffer memory 436 are processed to obtain display image data to be displayed at the display LCD 3 by the DSP 433 and the display image data are then written into the frame memory 435. A photographic image which is displayed at the display LCD 3 through this process is referred to as a freeze image. The DSP 433 then executes data compression on the image data having undergone such image preprocessing and the compressed image data are recorded into the memory card 424 which is a recording medium (a PC card, a CF card or the like) such as a flash memory. A specific data name is assigned to the image data by the CPU 439 when the image data are recorded into the memory card 424 with the time information provided by the timer 445 appended thereto.

Figure 3:
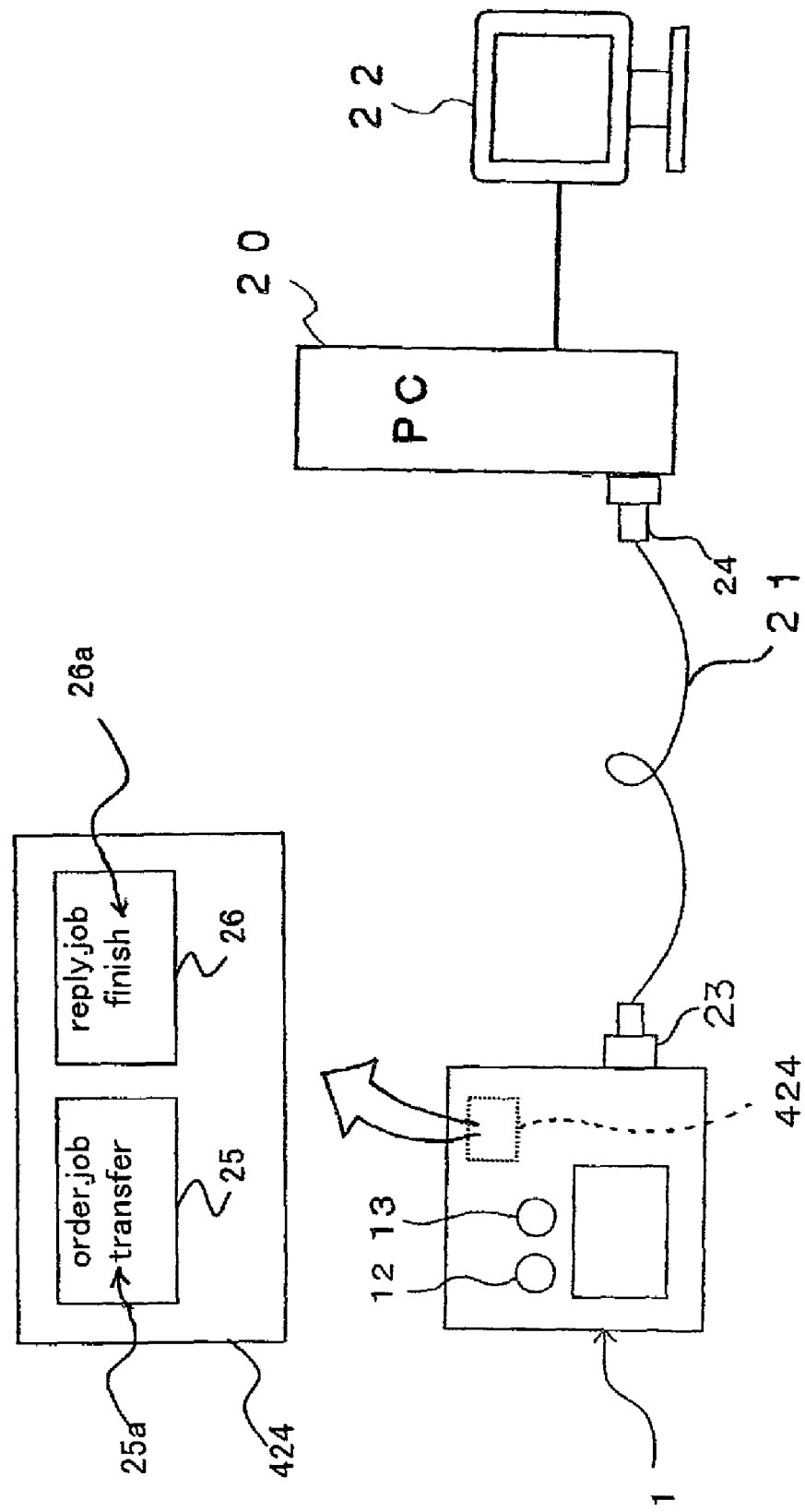
FIG. 3 illustrates the system configuration adopted to transfer image data to the hard disk in the PC 20.

Next, an explanation is given on the transfer of the image data recorded in the memory card 424. FIG. 3 shows the system configuration assumed to transfer the image data into a hard disk in a PC (personal computer) 20. By connecting the USB connector terminal 23 of the electronic camera 1 to a USB connector 24 of the PC 20 with a USB cable 21, the electronic camera 1 and the PC 20 become connected with each other. The image transferred to the PC 20 can be displayed at a monitor 22 connected to the PC 20.

A transfer processing software program is pre-installed in the PC 20. After starting up the software program, the transfer button 12 of the electronic camera 1 is pushed to start an image transfer to the PC 20. In the electronic camera in the embodiment, a transfer marking to be detailed later is appended to the image data to be transferred to the PC 20 among the image data recorded in the memory card 424. In other words, only the image data appended with the transfer marking are transferred during the image transfer.

It is to be noted that while the transfer processing software program is started up in advance in the PC 20 in the embodiment, the software program may instead be started up automatically after verifying that the electronic camera 1 has been connected via the USB cable 21. Since the image file transfer can be executed simply by operating the transfer button 13 at the electronic camera 1 after connecting the electronic camera 1 to the PC 20 in the latter case, the transfer operation is greatly simplified.

When the transfer button 13 at the electronic camera 1 is operated, an "order. job" file 25 is created within the memory card 424. The "order. job" file 25 is a file which is referenced by the PC 20, and as the PC 20 reads a "transfer" instruction 25a included in the "order. job" file 25, the image file transfer by the PC 20 is started up. Upon detecting the "order. job" file 25 in the memory card 424, the PC 20 creates a "reply. job" file 26 in the memory card 424. The "reply. job" file 26 is referenced by the electronic camera 1.

When the image file transfer is completed, the PC 20 enters a "finish" instruction 26a in the "reply. job" file 26. In response to the "finish" instruction 26a in the "reply. job" file 26, the electronic camera 1 deletes the "order. job" file 25 from the memory card 424. In addition, upon verifying that the "order. job" file 25 has been deleted from the memory card 424, the PC 20 deletes the "reply. job" file 26 from the memory card 424. Thus, by executing the processing on the camera side and the processing on the PC side in relation to each other via the memory card 424, the transfer work is executed to transfer the image data to the PC 20.

(Transfer Marking)

Figure 4:
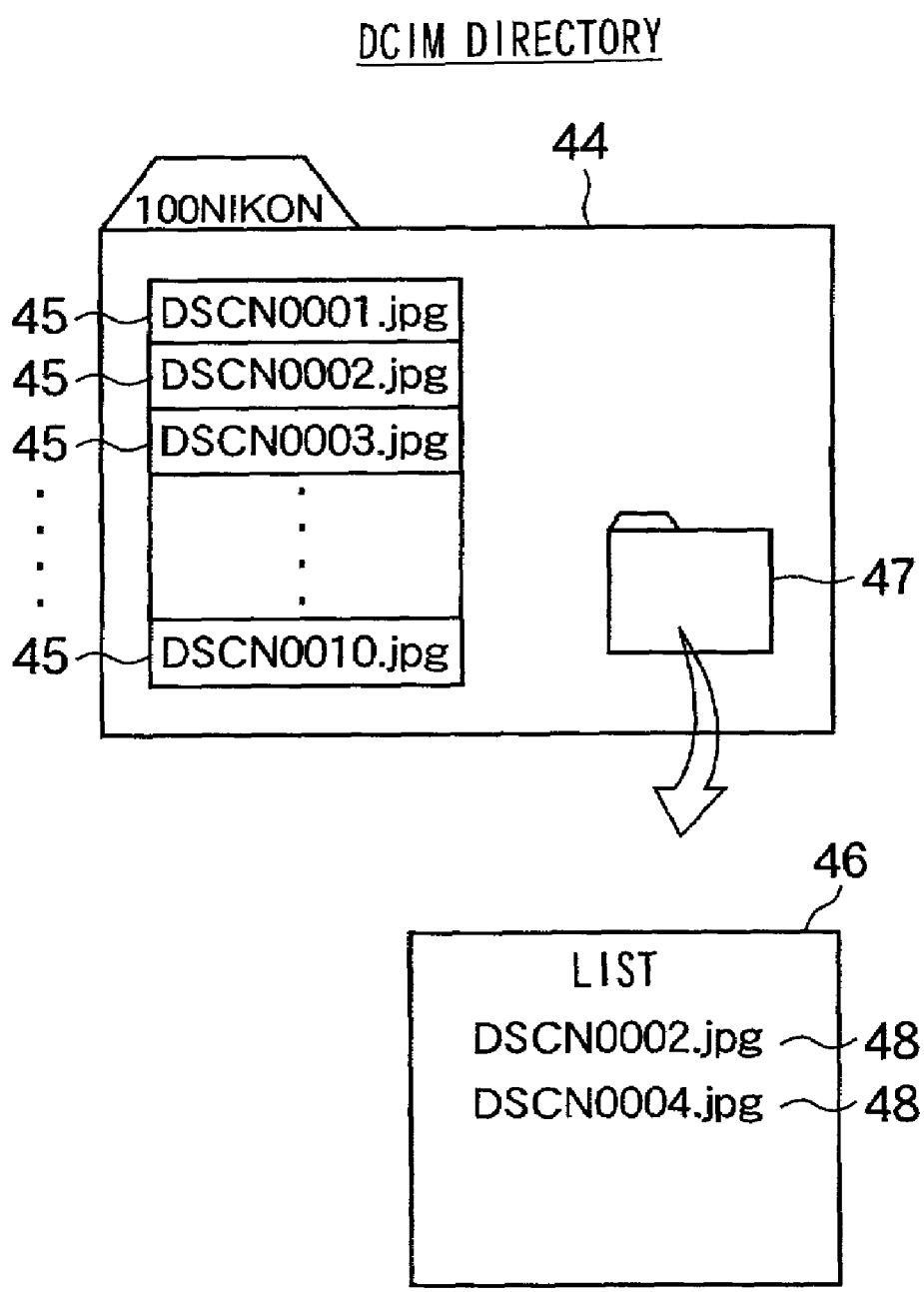
FIG. 4 illustrates the qualitative file structure assumed inside the memory card 424.

A "DCIM" directory is created in the memory card 424. FIG. 4 illustrates the qualitative file structure achieved in the directory. In the DCIM directory, an image folder 44 assigned with a name "100 NIKON" is created in advance. Image files 45 containing image data obtained through photographing operations are stored within the image folder 44. The image files 45 are assigned with filenames such as "DSCN0001.jpeg", "DSCN0002.jpeg" and "DSCN0003.jpeg" indicating the order in which they are obtained through photographing operations. In the example presented in FIG. 4, ten image files 45 "DSCN0001.jpeg"~"DSCN0010.jpeg" are stored.

Figure 5A:
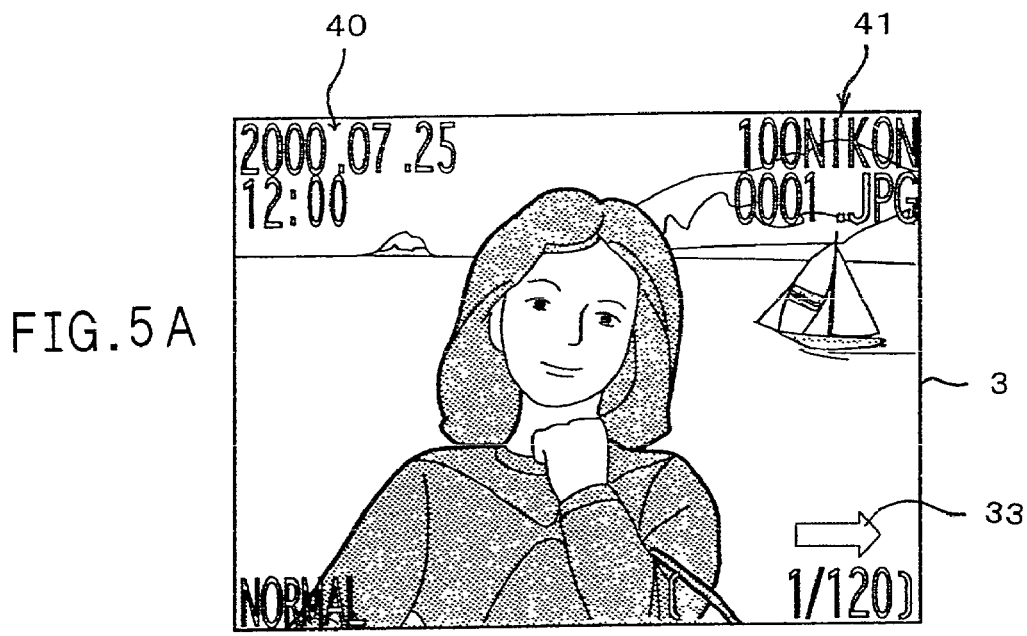
FIGS. 5A and 5B are provided to facilitate an explanation of the methods adopted to set the transfer marking during reproduction operations, with FIG. 5A showing a single frame reproduction operation and FIG. 5B showing a thumbnail reproduction operation.

For instance, if the transfer button 12 is pushed after reproducing and displaying a single frame image at the display LCD 3 as shown in FIG. 5A, a transfer mark 33 indicating that the transfer marking has been appended is brought up on display at the display LCD 3. At this time, a list file 47 is created and the filename 48 assigned to the displayed image is recorded into the list file 47. The contents recorded in the list file 47 are indicated in a list 46. In the example presented in FIG. 4, filenames 48, i.e., the filenames "DSCN0002.jpeg" and "DSCN0004.jpeg", are recorded in the list 46. The phrase "the transfer marking is appended to image data (an image file)" in this context means that the corresponding image filename 48 is recorded in the list file 47, as shown in FIG. 4. In addition, once the transfer marking is cleared, the filename 48 of the image file 45 from which the transfer marking is cleared is deleted from the list file The transfer processing software program for the PC 20 controls the PC 20 so as to transfer only the image files 45 with their filenames recorded in the list file 47 to the PC 20 from the image folder 44 by referencing the list file 47.

In the reproduction mode, the image files 45 recorded in the memory card 424 can be deleted one frame at a time or all the image files 45 recorded in the memory card 424 can be deleted at once by operating the delete button 14 shown in FIG. 1. Such a delete operation to delete the image files 45 is performed by using a delete setting menu.

In the embodiment, once the transfer marking is appended to an image file 45, deletion of that particular image file 45 is disallowed. In other words, even if an instruction for deleting an image file 45 appended with the transfer marking is issued, the delete instruction is disregarded. When a batch delete is executed in the example presented in FIG. 4, all the image files 45 except for the image files 45 assigned with the filenames "DSCN0002.jpeg" and "DSCN0004.jpeg", are deleted from the image folder 44. It is to be noted that the image files 45 assigned with the filenames "DSCN0002.jpeg" and "DSCN0004.jpeg", too, can be deleted once the transfer marking appended thereto is cleared. When the transfer marking is cleared from all image files, the list file 47 is deleted from the image folder 44.

(Timing With Which Transfer Marking is Set)

It is necessary to set the transfer marking described above in advance prior to the execution of the transfer operation. The transfer marking can be set either in the recording mode or in the reproduction mode. In the recording mode, the transfer marking may be set; (a) in a batch through a setting menu or (b) while a freeze image is on display immediately after a photographing operation. In the reproduction mode, on the other hand, the transfer marking may be set; (c) by reproducing and displaying a single frame image at the display LCD 3, (d) while displaying reproduced thumbnail images at the display LCD 3 or (e) in a batch setting/clearing procedure implemented through the setting menu as in the recording mode.

(a) Setting the Transfer Marking in a Batch Through the Setting Menu

Figure 6:
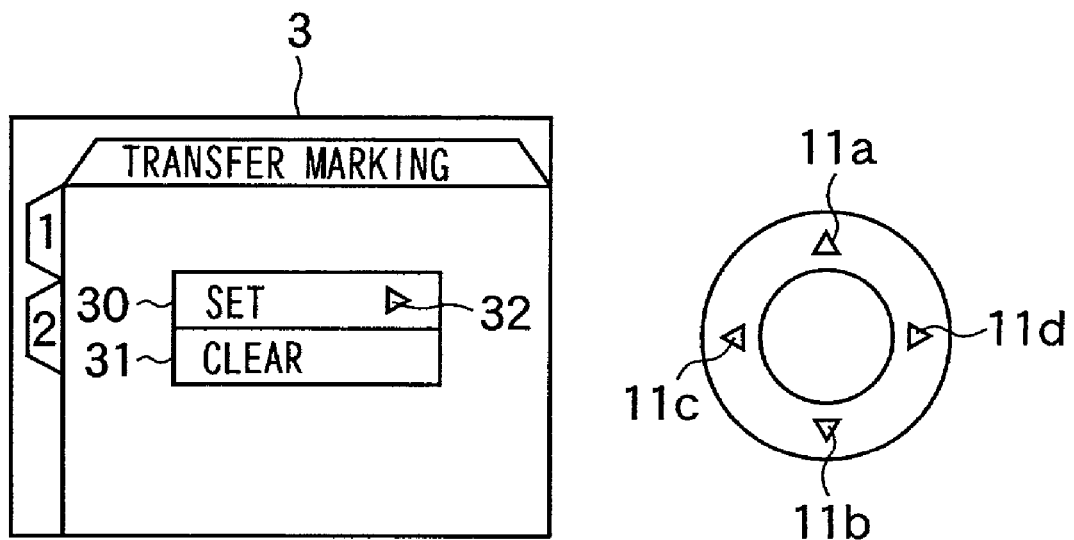
FIG. 6 shows the transfer marking setting menu brought up on the display LCD 3.

When setting the transfer marking in a batch through the setting menu, the transfer marking setting menu shown in FIG. 6 is brought up on display at the display LCD 3 by pushing the menu button 10 and the selector buttons 11a~11d. In the transfer marking setting menu, items "SET" and "CLEAR" are displayed. A mark 32 in FIG. 6 indicates that the item "SET" is currently selected. This selection state can be changed by pushing the selector buttons 11a and 11b.

When the selector button 11d is pushed, the selection state is confirmed. Namely, when the item "SET" is selected as shown in FIG. 6 and then the selector button 11d is pushed, the electronic camera 1 enters a transfer marking setting state. In the transfer marking setting state, the transfer marking is automatically appended to all sets of image data obtained through photographing operation. If, on the other hand, the item "CLEAR" is selected and the selection is confirmed, the electronic camera 1 enters a transfer marking cleared state in which the transfer markings having been appended to the data of photographed images are deleted. It is to be noted that the batch setting/clearing operation is performed in the reproduction mode in a manner similar to that in which the batch setting/clearing operation is performed in the recording mode. Namely, the transfer marking is appended to all the image files 45 recorded in the memory card 424 through batch setting and when "CLEAR" is selected, the transfer marking having been appended to the image files 45 becomes cleared.

(b) Setting the Transfer Marking While a Freeze Image is on Display

Figure 7:
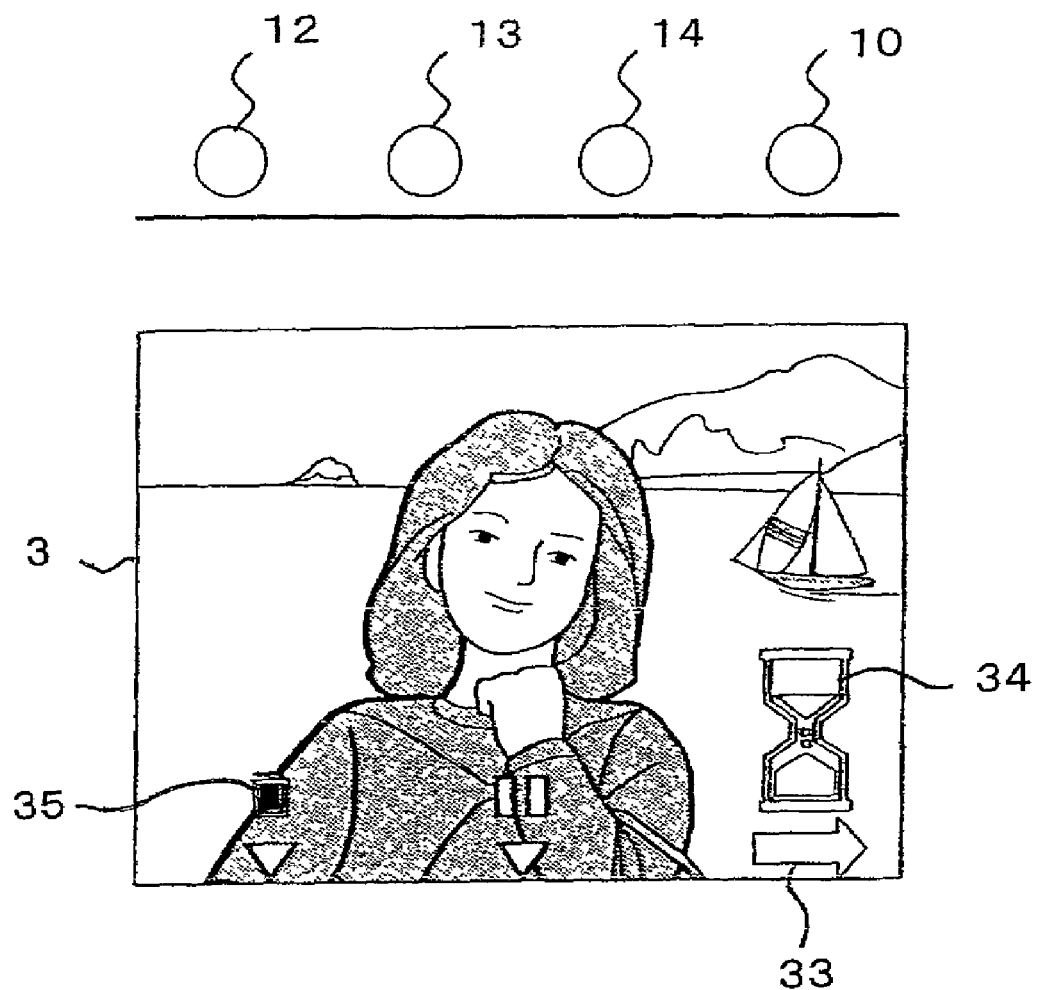
FIG. 7 is provided to facilitate an explanation of the transfer marking setting operation executed while a freeze image is on display.

As explained earlier, when a photographing operation is initiated by pressing the shutter release button 5 all the way down and the photographic image is recorded into the memory card 424 as a result, the photographed image is brought up on display at the display LCD 3 as a freeze image over a predetermined length of time as shown in FIG. 7. A mark 34 in FIG. 7 indicates that the image is being recorded. If the transfer button 12 is pushed while the mark 34 is on display, the transfer marking is appended to the image data and the transfer mark 33 is brought up on display.

It is to be noted that when the batch setting mentioned earlier is selected prior to the photographing operation, the transfer mark 33 in FIG. 7 is brought up on display at the display LCD 3 even if the transfer button 12 is not pushed. In addition, a quick delete mark 35 is displayed at the display LCD 3 while an image is being recorded. If the delete button 14 is operated while the quick delete mark 35 is on display, the recording operation for recording the image into the memory card 424 is canceled. However, after the transfer marking has been appended, any delete instruction is disregarded as explained earlier to continuously record the image into the memory card 424.

(c) Setting the Transfer Marking While a Reproduced Single Frame Image is on Display FIG. 5A mentioned earlier shows the display LCD 3 at which a reproduced single frame image is on display. As shown in FIG. 5A, a photographing date 40, a filename 41 assigned to the image data and the like are displayed together with the captured image. If the transfer button 12 shown in FIG. 1 is pushed while a reproduced single frame image is on display, the transfer marking is appended to the image data and the transfer mark 33 is brought up on display at the display LCD 3. It is to be noted that when image data appended with the transfer marking in the recording mode are reproduced and displayed at the display LCD 3, the transfer mark 33 is displayed together with the image as shown in FIG. 5A.

(d) Setting the Transfer Marking While Displaying Reproduced Thumbnail Images

Figure 5B:
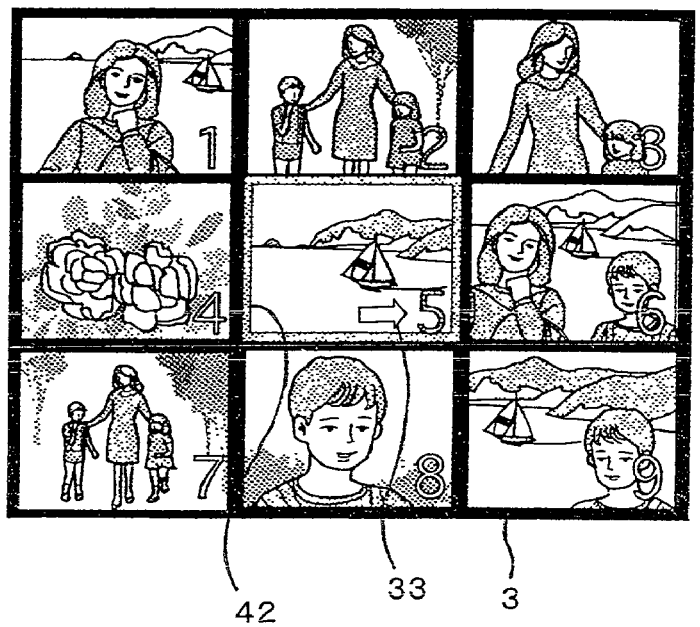

FIG. 5B shows the display LCD 3 at which thumbnail images are on display. At the display LCD 3, a total of nine thumbnail images, i.e., three thumbnail images (along the vertical direction)×three thumbnail images (along the horizontal direction), are displayed. In FIG. 5B, the fifth thumbnail image displayed at the center is enclosed by a selection frame 42. The selection frame 42 can be moved up and down and to the left and right to enclose another thumbnail image by operating the selector switches 11a~11d shown in FIG. 1. As shown in FIG. 5B, if the transfer button 12 in FIG. 1 is pushed while the fifth image is enclosed by the selection frame 42, i.e., while the fifth image is selected, the transfer marking is appended to the fifth image and the transfer mark 33 is displayed at the fifth image. While thumbnail images are on display, the transfer marking can be appended sequentially to a plurality of sets of image data.

It is to be noted that if the transfer button 12 is pushed again while the transfer mark 33 is on display as shown in FIGS. 5A and 5B, the transfer marking is cleared and the display of the transfer mark 33 is cleared as well.

(Transfer Operation)

Figure 8:
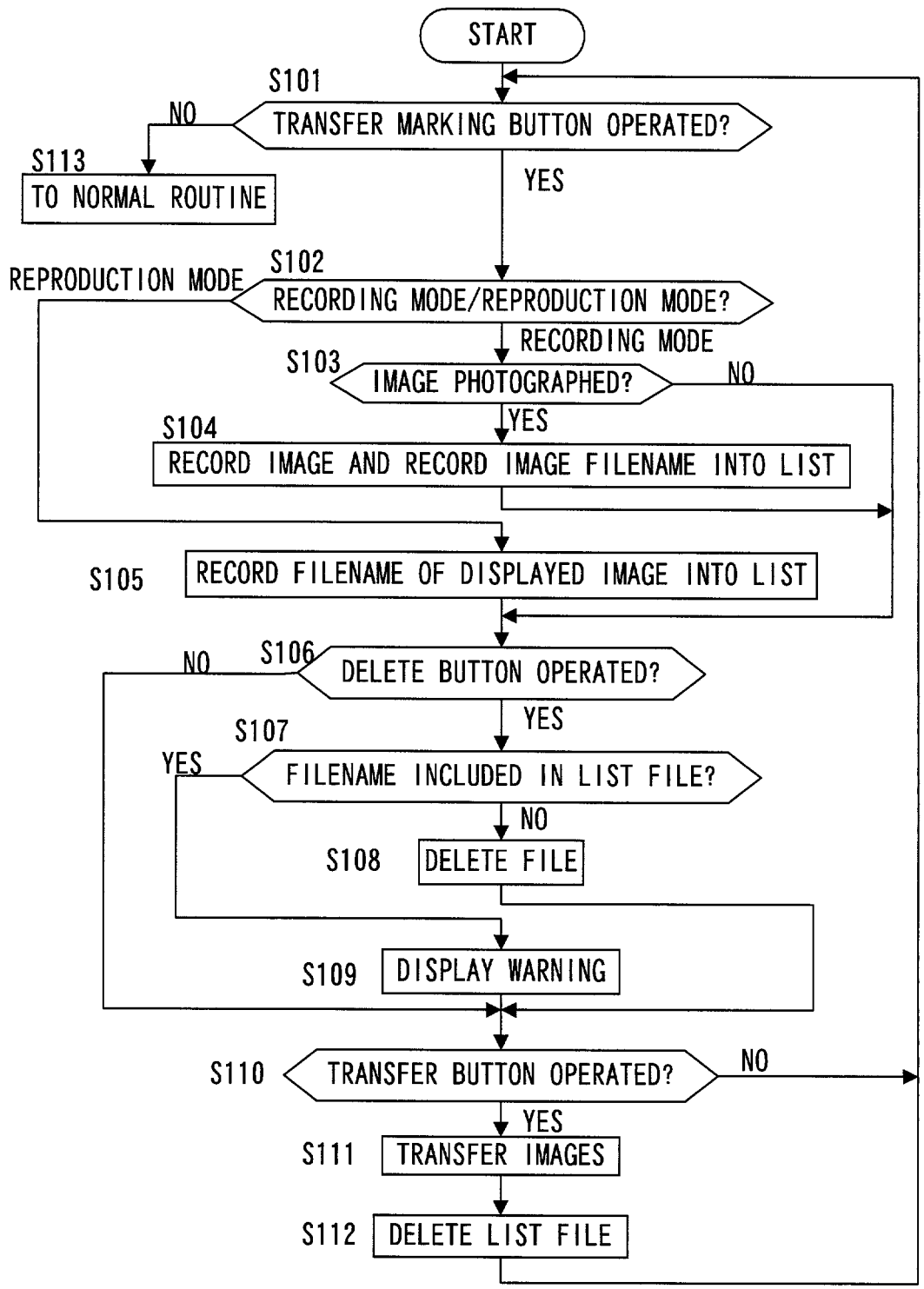
FIG. 8 presents a flowchart of the procedure of the processing starting with appending the transfer marking and ending with completing the image transfer.

Now, an explanation is given on details of the transfer operation. FIG. 8 presents a flowchart of the procedure executed in conformance to the program during the processing starting with appending the transfer marking and ending with completion of the image transfer. It is to be noted that this program is stored in the ROM 443. The following explanation is given by assuming that the transfer marking operation is performed through an operation of the transfer marking button 12 and that the image deletion is executed through the delete button 14. In step S101, it is judged as to whether or not the transfer marking button 12 has been operated. If a negative judgement (NO) is made in step S101, the operation proceeds to step S113 to engage in a normal routine which is executed when no transfer marking operation has been initiated. If, on the other hand, an affirmative judgement (YES) is made in step S101, the operation proceeds to step S102 to judge as to whether the recording mode or the reduction mode has been set with the dial 6. If it is judged in step S102 that the recording mode has been selected, the operation proceeds to step S103, whereas if it is judged that the reproduction mode has been selected, the operation proceeds to step S105.

In step S103, it is judged as to whether or not an image has been photographed. If it is judged that an image has been photographed, the operation proceeds to step S104, whereas if it is judged that no image has been photographed, the operation proceeds to step S106. In step S104, an image file 45 containing the photographed image is recorded into the image folder 44 in the memory card 424 and a filename 48 assigned to the image file 45 is recorded in the list file 47. If, on the other hand, it is judged in step S102 that the reproduction mode has been selected and the operation proceeds to step S105 accordingly, the image filename on display at the display LCD 3, as shown in FIG. 5A, or the filename of the image enclosed by the selection frame 42 in the thumbnail display as shown in FIG. 5B is recorded in the list file 47 and the transfer mark 33 is brought up on display at the display LCD 3. In the following step S106, it is judged as to whether or not the delete button 14 has been operated. The operation proceeds to step S107 if it is judged that the delete button 14 has been operated whereas the operation proceeds to step S110 if it is judged that the delete button 14 has not been operated.

Figure 9:
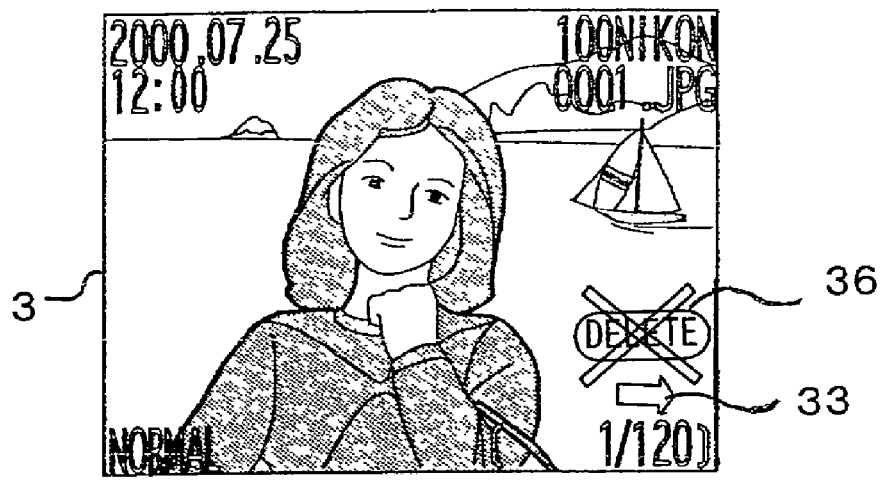
FIG. 9 presents a display example of the warning mark 36.

In step S107, it is judged as to whether or not the filename 48 assigned to the image file 45 with regard to which the delete instruction has been issued is recorded in the list file 47. If a negative judgement (NO) is made in step S107, the operation proceeds to step S108. In step S108, the image file 48 with regard to which the delete instruction has been issued is deleted from the image folder 44 before the operation proceeds to step S110. If, on the other hand, an affirmative judgement (YES) is made in step S107, the operation proceeds to step S109. In step S109, a warning mark 36 indicating that erasure is disabled, as shown in FIG. 9, is brought up on display at the display LCD 3. In this case, the image file 45 assigned with the filename 48 that is recorded in the list file 47 is not deleted. Once the warning mark 36 is brought up on display at the display LCD 3, the operation proceeds to step S110.

In step S110, it is judged as to whether or not the transfer button 13 has been operated. If it is judged that the transfer button 13 has been operated, the operation proceeds to step S111, whereas if it is judged that the transfer button 13 has not been operated, the operation returns to step S101. In step S111, the image files 45 with the filenames 48 recorded in the list file 47 are transferred to the PC 20 via the USB cable 21. In the example presented in FIG. 4, the image data corresponding to the filenames "0002.jpeg" and "0004.jpeg" are transferred to the PC 20. In the following step S112, the list file 47 is deleted. After the list file 47 is deleted, the operation returns to step S101.

(Example of Variation)

Figure 10:
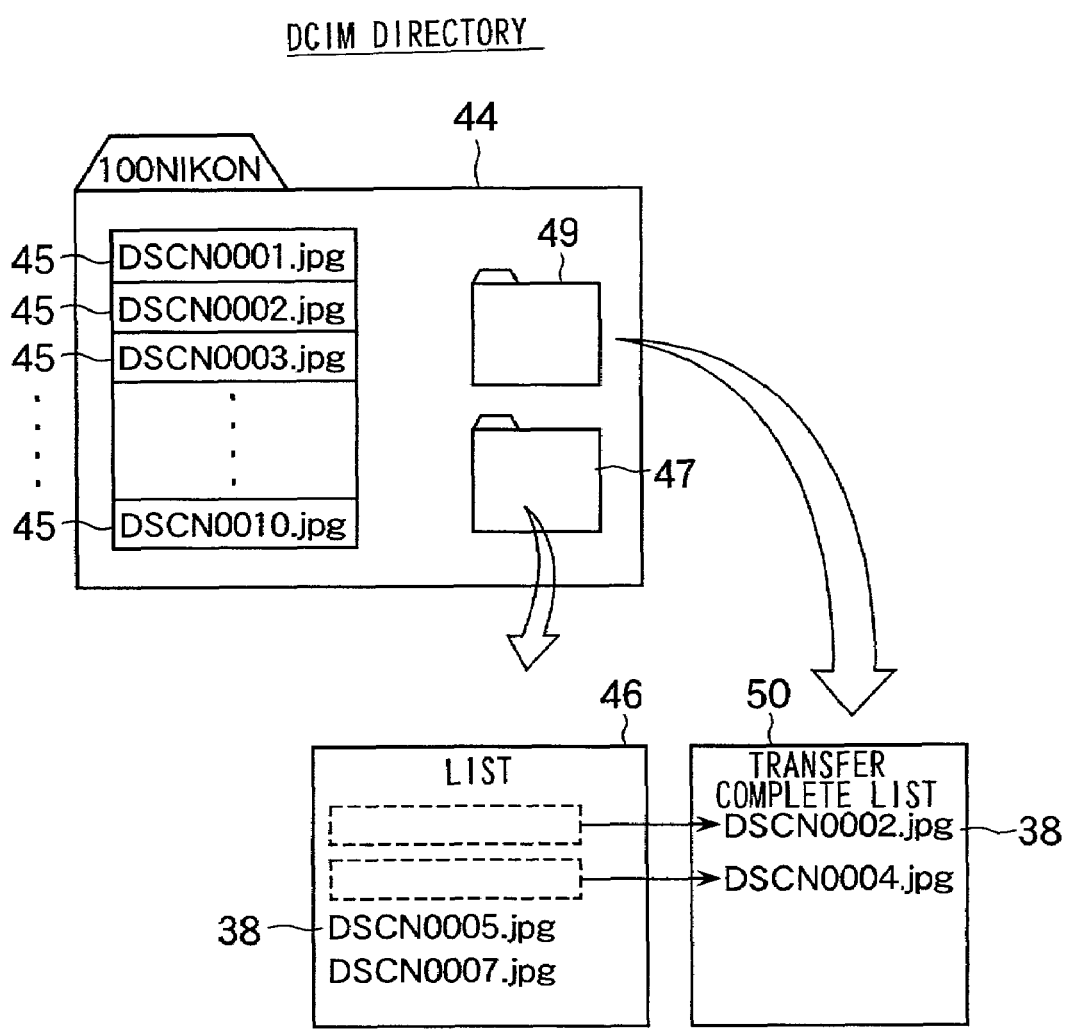
FIG. 10 shows the folder structure adopted in an example of a variation.

In the example of variation explained below, a transfer complete list file 49 is created in the image folder 44 as shown in FIG. 10 when the image data transfer is completed. A transfer complete list 50 indicates the contents recorded in the transfer complete list file 49. The filenames 48 of image files 45 that have already been transferred are deleted from the list file 47 and are relocated to the transfer complete list file 49. In the example presented in FIG. 10, the image files 45 assigned with the filenames "DSCN0002.jpeg" and "DSCN0004.jpeg" have been transferred while the image files 45 with the filenames "DSCN0005.jpeg" and "DSCN0007.jpeg" have not been transferred yet.

For instance, if the image transfer is forcibly terminated in the state shown in FIG. 10, the image files 45 with the filenames "DSCN0005.jpeg" and "DSCN0007.jpeg" will not have been transferred to the PC 20 yet. If the transfer operation is restarted by pushing the transfer button 13 again in this state, the PC 20 references the list file 47 so as to transfer the image files 45 with the filenames "DSCN0005.jpeg" and "DSCN0007.jpeg" recorded in the list file 47 from the image folder 44 in the memory card 424 to the PC 20.

In addition, if an instruction for a re-transfer is issued through a setting menu, filenames 38 recorded in the transfer complete list file 49 are deleted and are relocated to the file list 47. When the transfer button 13 is subsequently operated, the image files assigned with the filenames "DSCN0002.jpeg", "DSCN0004.jpeg", "DSCN0005.jpeg" and "DSCN0007.jpeg" recorded in the list file 47 are transferred from the image folder 44 to the PC 20.

Figure 11:
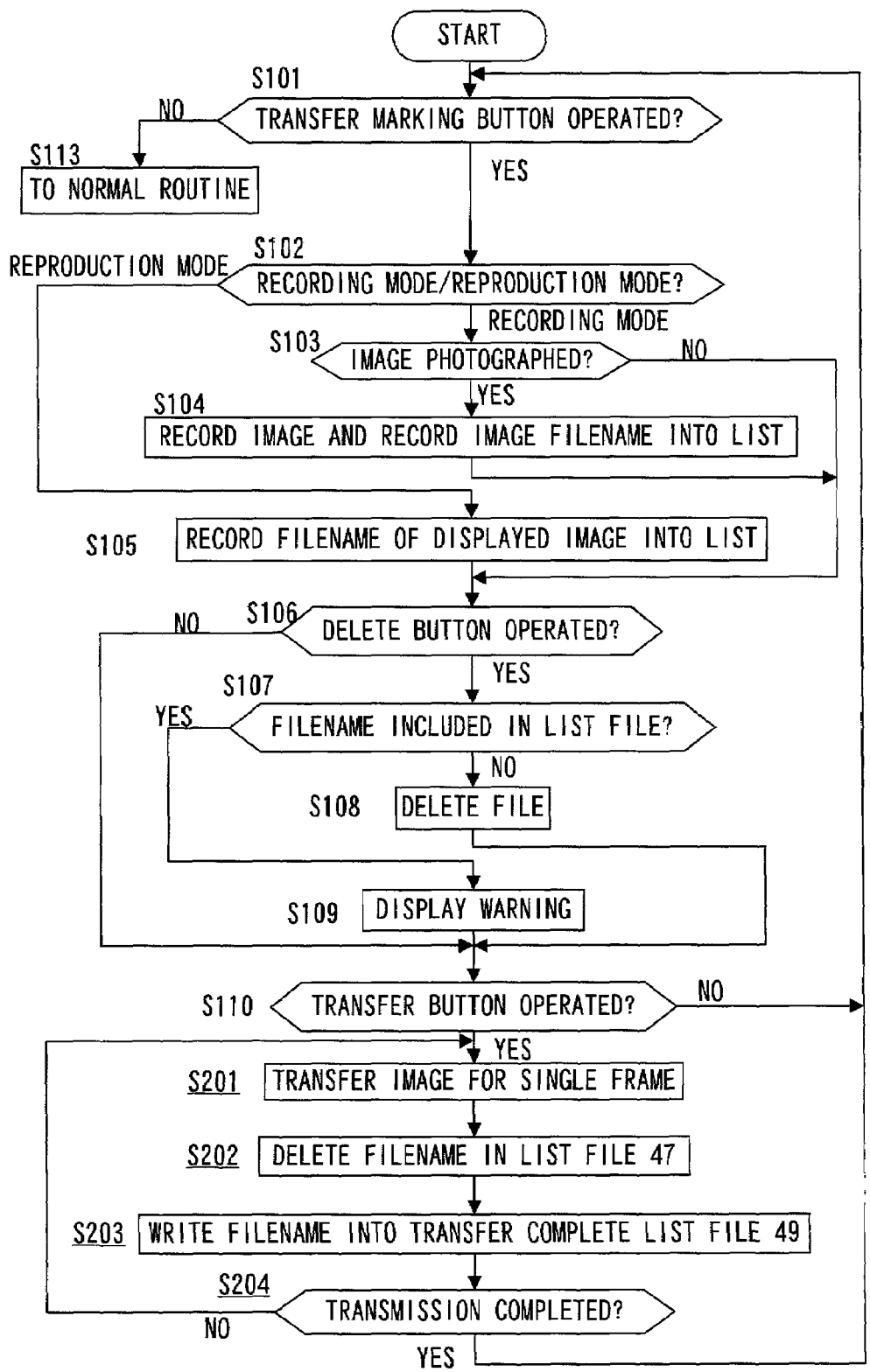
FIG. 11 presents a flowchart of the procedure of the processing starting with appending the transfer marking and ending with completing the image transfer, which is achieved in the example of variation.

FIG. 11 presents a flowchart of the procedure implemented in the example of variation. The same step numbers are assigned to steps in which processing similar to that in FIG. 8 is implemented to preclude the necessity for a repeated explanation thereof. The processing procedure in the flowchart presented in FIG. 11 is now explained by referring to FIG. 10. The procedure of the processing from step S101 through step S110 and in step S113 in FIG. 11 is identical to that in the flowchart in FIG. 8.

In step S201, an image file 45 corresponding to a single frame is transferred. Once the image file 45 corresponding to a single frame is transferred, the operation proceeds to step S202. Instep S202, the filename 48 assigned to the image file 45 which has been transferred is deleted from the list file 47. For instance, if the image file 45 with the filename "DSCN0005.jpeg" is transferred in step S201, the filename "DSCN0005.jpeg" is deleted from the file list 47 in step S202. When the filename 48 of the transferred image file 45 has been deleted from the list file 47, the operation proceeds to step S203.

In step S203, the filename "DSCN0005.jpeg" deleted in step S202 is recorded into the transfer complete list file 49. In the following step S204, it is judged as to whether or not all the image files 45 with the filenames 38 recorded in the list file 47 have been transferred. If it is judged that the transfer has not been completed yet in step S204, the operation returns to step S201 to transfer the next image file 45 with the filename recorded in the list file 47. In the example presented in FIG. 10, the image file 45 assigned with the filename "DSCN0007.jpeg" which is the second listing recorded in the list file 47 is transferred. Then, the filename "DSCN0007.jpeg" is processed in steps S202 and S203 as described above and once the transfer of all the image files 45 assigned with the filenames 38 which are recorded in the list file 47 is completed, the operation returns from step S204 to step S101.

Under normal circumstances, an image file of an image obtained through a photographing operation in an electronic camera that the user wishes to save for later use is transferred from the recording medium (the memory card 424 in the embodiment explained above) in the camera and recorded into a hard disk device or the like of a PC. In the electronic camera 1 achieved in the first embodiment, the transfer marking is appended to image files 45 to be transferred to the PC 20 or the like and thus, the image files 45 appended with the transfer marking alone are transferred. Since deletion of any image file 45 appended with the transfer marking is disallowed, the warning mark 36 shown in FIG. 9 is brought up on display at the display LCD 3 if the delete button 14 is operated. As a result, the user, who is reminded that the image file 45 that he is attempting to delete is actually appended with the transfer marking, is prevented from deleting the image files 45 appended with the transfer marking by mistake.

In addition, by creating the transfer complete list file 49, the re-transfer operation that must be executed to re-transfer a given image file 45 can be simplified. For instance, the transfer complete list file 49 can prove particularly useful when a transfer operation is interrupted due to depletion of battery power in the electronic camera 1.

Second Embodiment

While the transfer marking is set by recording a filename 49 in the list file 47 in the first embodiment, tag information related to transfer marking is recorded in an image file 45 as additional information in the second embodiment. It is to be noted that the term "tag information" in this context refers to information that can be made to correlate to the image data contained in the image file 45. The PC 20 judges as to whether or not each image file 45 is appended with tag information and reads only image files 45 appended with the tag information into the PC 20.

Figure 12:
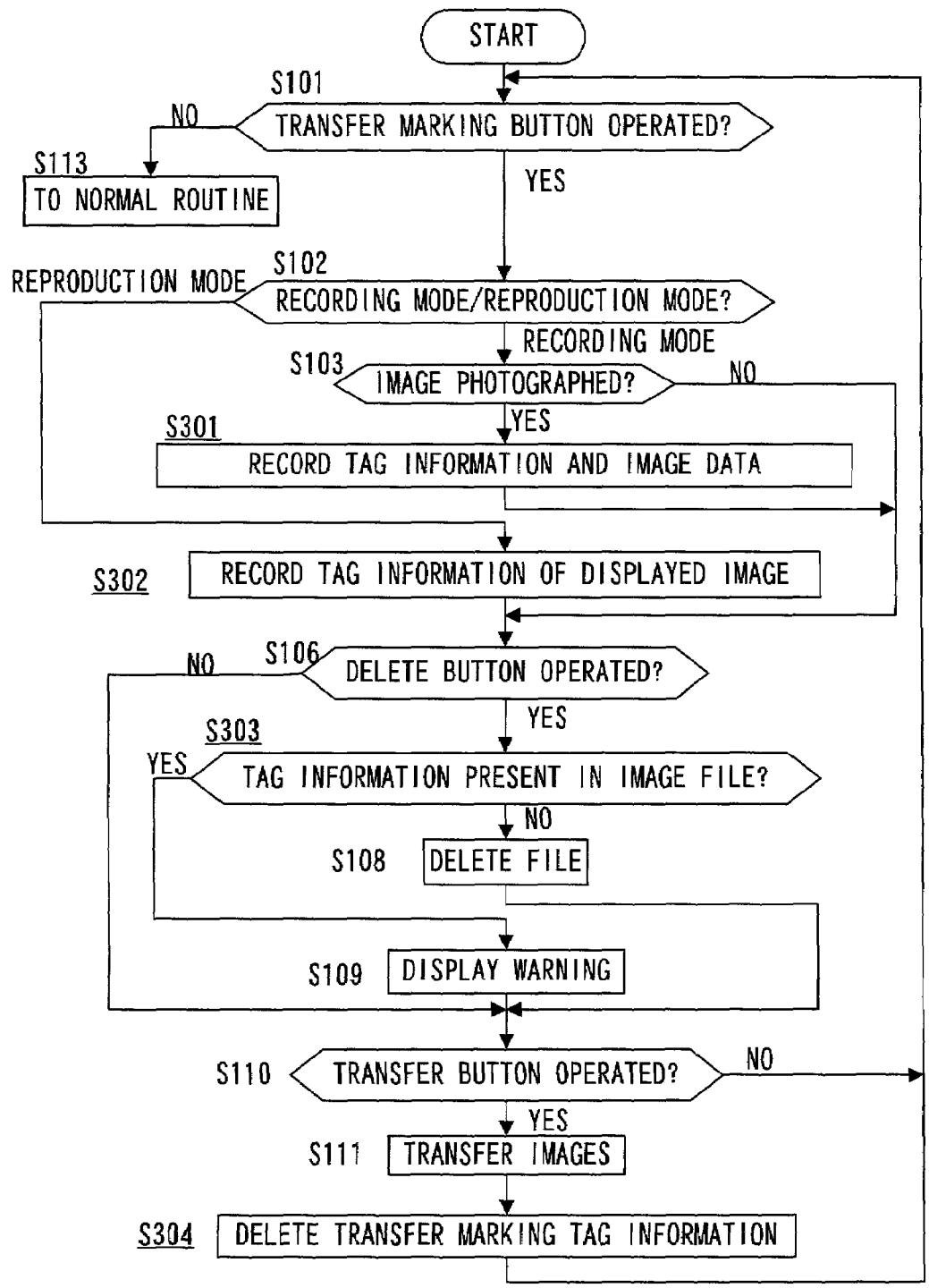
FIG. 12 presents a flowchart of the procedure of the processing starting with appending the transfer marking and ending with completing the image transfer, as implemented in a second embodiment.

FIG. 12 presents a flowchart similar to the flowchart in FIG. 8, showing the procedure of the processing starting with appending the transfer marking and ending with completing the image transfer. The same step numbers are assigned to steps in which processing identical to that in the flowchart in FIG. 8 is performed. The following explanation focuses on the procedure of processing that is different from that in the flowchart in FIG. 8. If it is judged in step S103 that an image has been photographed, the operation proceeds to step S301. In step S301, tag information with regard to the transfer marking is recorded into the image file 45. It is to be noted that no list file such as the list file 47 shown in FIG. 4 is created in the second embodiment.

If it is judged in step S102 that the reproduction mode has been selected, the operation proceeds to step S302. In step S302, the tag information related to the transfer marking is recorded in the image file 45 displayed at the display LCD 3, as shown in FIG. 5A, or in the image file 45 enclosed by the selection frame 42 in the thumbnail display, as shown in FIG. 5B, and the transfer mark 33 is brought up on display at the display LCD 3. Once the tag information is recorded, the operation proceeds to step S106.

If it is judged in step S106 that the delete button 14 has been operated, the operation proceeds to step S303. In step S303, it is judged as to whether or not the image file 45 contains tag information. If it is judged in step S303 that no tag information is contained in the image file 45, the operation proceeds to step S108 to delete the image file 45 from the image folder 44. If, on the other hand, it is judged in step S303 that tag information is present in the image file 45, the operation proceeds to step S109 to display the warning mark 36 indicating that erasure is disabled at the display LCD 3 as shown in FIG. 9. Once the processing in step S108 or step S109 is executed, the operation proceeds to step S110. Following the image transfer executed in step S111 after judging in step S110 that the transfer button 13 has been operated, the operation proceeds to step S304. In step S304, the tag information is deleted from the image file 45 that has been transferred and then the operation returns to step S101.

The subsequent processing following an interruption in the transfer is carried out by creating the transfer complete list file 49 in the first embodiment as explained earlier. In the second embodiment, image files can be processed in a manner similar to that in the first embodiment by recording tag information indicating transfer completion in the individual image files 45 in the second embodiment. As a result, advantages similar to those achieved in the first embodiment are realized in the electronic camera in the second embodiment, as well.

In addition, the delete processing of image files 45 appended with the transfer marking is disallowed in the embodiments described above. There are following examples of control on the image files 45 appended with the transfer marking other than disallowing the delete processing.

(1) Appending information indicating the number of prints into an image file 45

Image files in the known art include image files 45 into which print number information can be appended. The default setting for the number of prints is normally 0. Accordingly, if the transfer marking is appended, the number of prints is set to 1. It is to be noted that in an image file 45 having the number of prints already set, the setting is not changed even if the transfer marking is later appended thereto.

(2) Appending information indicating the number of transfers into an image file 45

When the transfer marking is appended to an image file 45 for the first time, 1 is recorded as transfer number information in, for instance, the header of the image file 45. Then, if the transfer marking is appended again after the initial transfer marking is cleared, the value "1" indicated by the transfer number information is incremented to 2. Subsequently, the value indicated by the transfer number information is incremented by 1 each time the transfer marking is appended. Since the camera ID, the user ID and the like are recorded in the header as well, the history management for the image file 45 can be facilitated in this manner. In addition, a secondary transmission of the image file 45 can be controlled by using the transfer number information.

(3) Disallowing format processing of the memory card 424

If the memory card 424 contains any image file 45 appended with the transfer marking, format processing of the memory card 424 is disallowed. As a result, an erroneous deletion of image files 45 caused by format processing is prevented.

(4) Disallowing relocation of an image file 45 from one folder to another

A plurality of image folders can be created within the memory card 424 and, if such is the case, a list file 47 is created in each image folder in the first embodiment. For this reason, if an image file 45 appended with the transfer marking is relocated to another image folder, the image file 45 is now stored in a folder other than the folder in which the list file 47 having the filename 48 of the image file 45 recorded therein is stored and, as a result, a normal transfer operation is disabled. Accordingly, relocation of any image file 45 appended with the transfer marking from one folder to another is disallowed in the first embodiment.

(5) If relocation of an image file 45 from one folder to another is to be allowed, the filename of the image file 45, too, should be relocated to the list file 47 of the new folder when the image file 45 is relocated.

(6) Disallowing any change in the filename assigned to an image file 45

(5) and (6) above are examples of control that may be implemented to ensure that the transfer operation is carried out in a normal manner, as through the control achieved by disallowing relocation between folders explained above. Either method may be adopted in the first embodiment in which the list files 47 are created. No problem arises even if the control (5) or (6) is not implemented in the second embodiment in which the tag information with regard to the transfer marking is recorded in individual image files 45.

Third Embodiment

Figure 13:
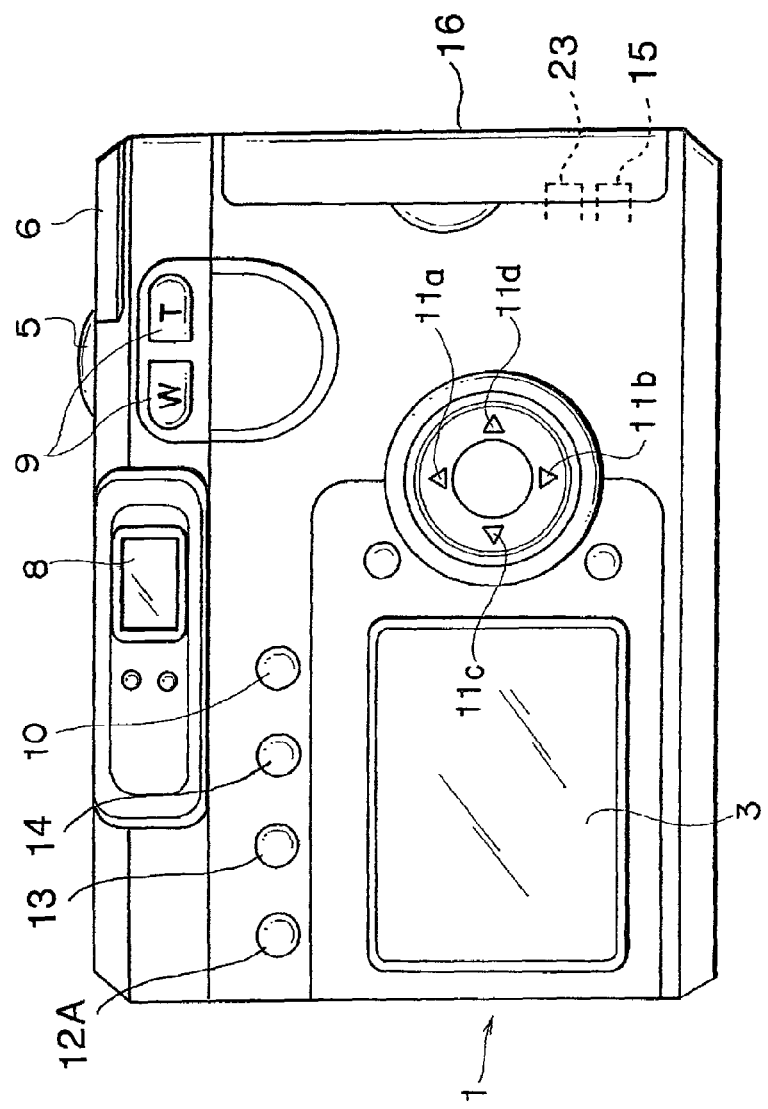
FIG. 13 is a rear view of the electronic camera achieved in a third embodiment.

FIG. 13 is a rear view of an electronic camera 1 achieved in the third embodiment. The plan view of the electronic camera 1 is identical to the plan view of the first embodiment presented in FIG. 1A. The transfer button 12 in the electronic camera in the third embodiment achieves both a transfer function and a marking function. When the USB communication cable 21 (see FIG. 15) is connected to the USB connector terminal 23, the transfer marking button 12A functions as a transfer button, and it functions as a marking button once the USB cable 21 is disengaged. An external power connector terminal 15 is provided to allow an AC adapter (not shown) to be connected. A detection device 457 (see FIG. 14) detects whether or not the AC adapter is currently connected to the external power connector terminal 15. The USB connector terminal 23 and the external power connector terminal 15 are provided inside a cover 16. As the cover 16 is opened, the terminals 23 and 15 become exposed.

Figure 14:
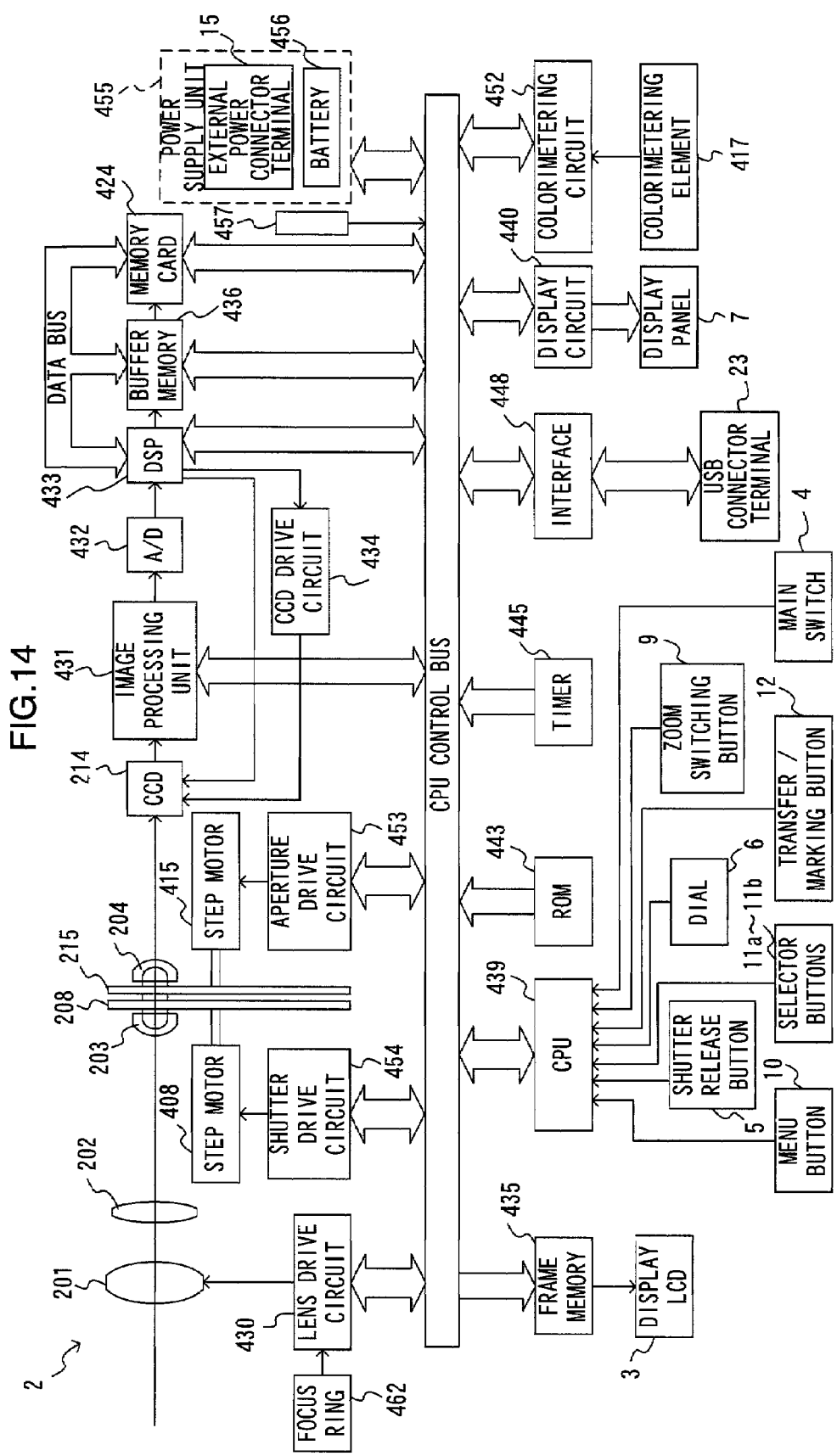
FIG. 14 is a circuit block diagram of the electronic camera achieved in the third embodiment.

FIG. 14 is a circuit block diagram of the electronic camera achieved in the third embodiment. The following is an explanation of components different from those in the circuit block diagram in FIG. 2. At a power supply unit 455, a battery 456 utilized to drive the camera and the external power connector terminal 15 are provided. As explained above, the detection device 457 detects whether or not the AC adapter is currently connected to the external power connector terminal 15.

Figure 15:
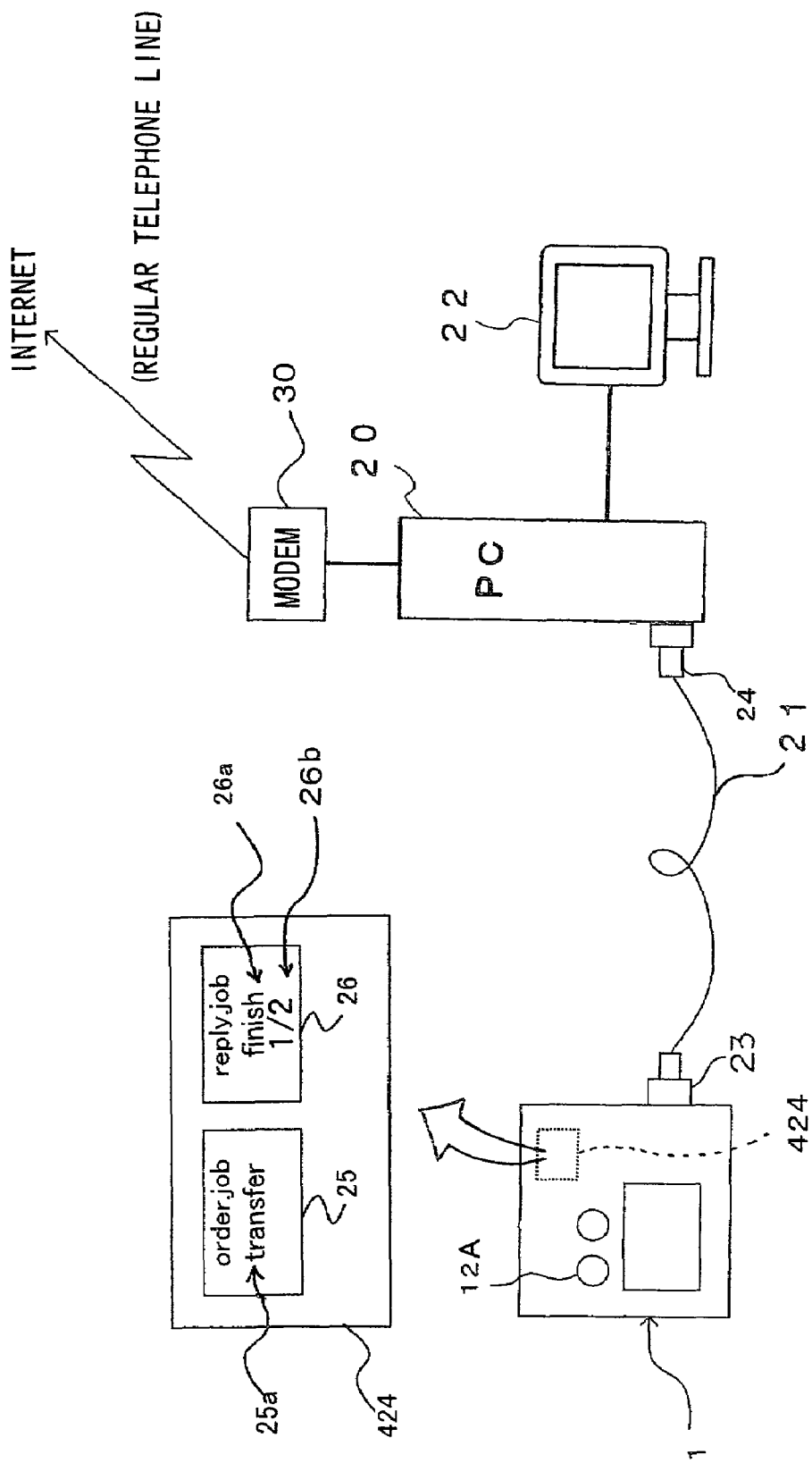
FIG. 15 illustrates the system configuration adopted to transfer image data to the hard disk in the PC 20.

FIG. 15 illustrates the system configuration adopted to transfer image files 45 (see FIG. 4) to a PC 20. The PC 20 is connected to the Internet via a modem 30 and a regular telephone line. For instance, image files 45 can be transferred to a photo service available on the Internet after transferring the image files 45 from the electronic camera 1 to the PC 20.

A transfer processing program is pre-installed in the PC 20. This program is automatically started up as the PC verifies that a specific file structure such as that shown in FIG. 4, for instance, is present in the electronic camera 1 connected through the USB cable 21. Once the USB cable 21 is connected to the electronic camera 1, the transfer marking button 12A of the electronic camera 1 functions as a transfer button through which a transfer start instruction is issued.

Figure 16:
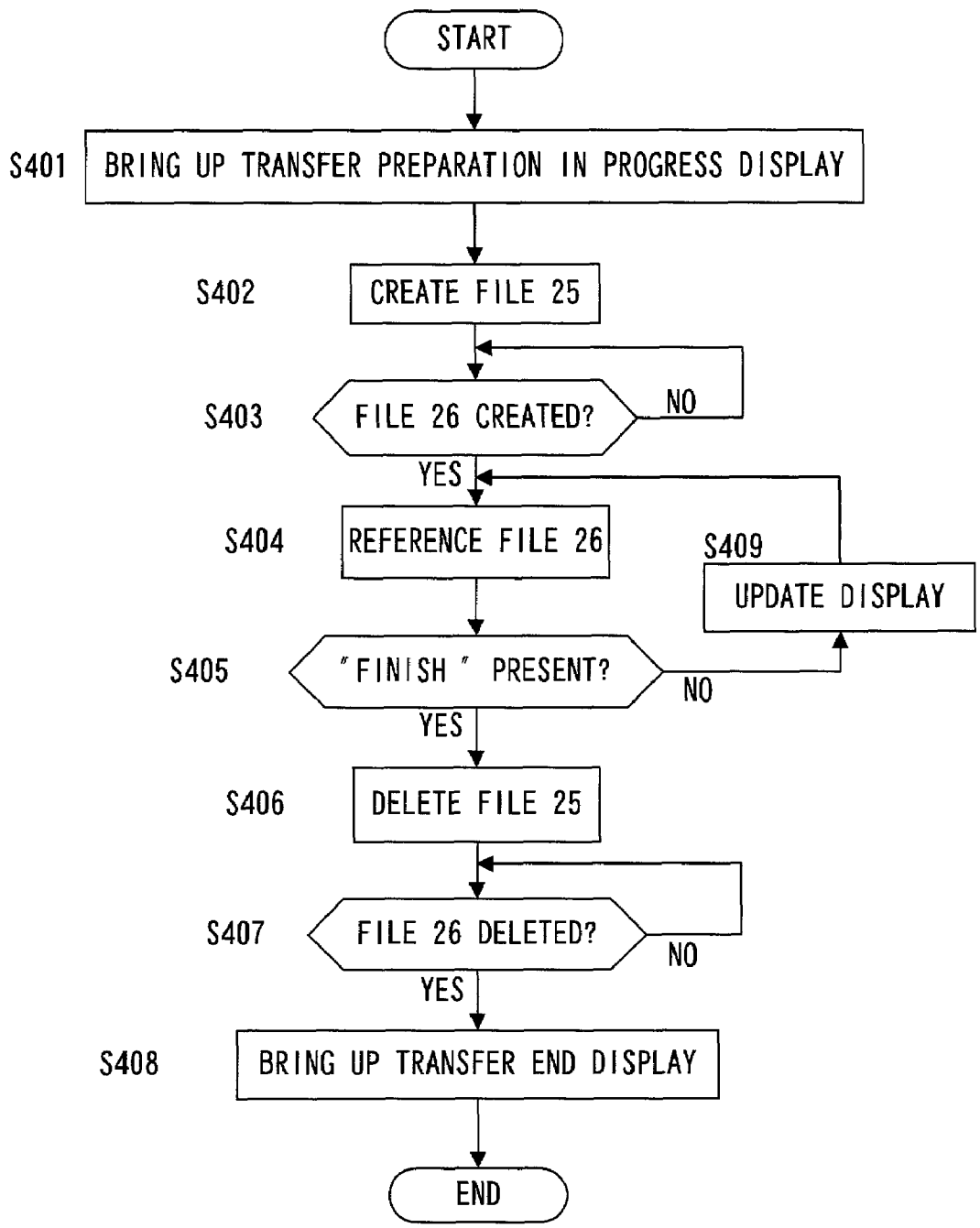
FIG. 16 presents a flowchart of the procedure of the processing executed on the camera side in the third embodiment.

FIGS. 16 and 17 present flowcharts of the procedures starting with an operation of the transfer marking button 12A and ending with completing the image file transfer. The flowchart in FIG. 16 shows the procedure of the processing executed on the electronic camera 1, whereas the flowchart in FIG. 17 shows the procedure of the processing executed at the PC 20. The following is an explanation of the transfer operation given in reference to the example presented in FIG. 4.

Figure 18A:
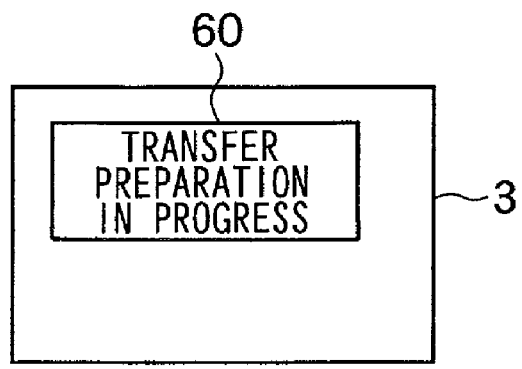
FIGS. 18A~18C present examples of display on the display LCD 3, with FIG. 18A showing the display brought up during the preparation for a transfer operation, FIG. 18B showing the display brought up while the transfer operation is in progress and FIG. 18C showing the display brought up when the transfer operation is completed.

First, the processing executed at the camera as shown in FIG. 16 is explained. The processing in the flowchart in FIG. 16 starts in response to an operation of the transfer marking button 12A at the electronic camera 1. In step S401, an indicator 60 indicating that the preparation for transfer operation is in progress is brought up on display at the display LCD 3, as shown in FIG. 18A. In the following step S402, an "order. job" file 25 shown in FIG. 15 is created in the memory card 424 and a "transfer" instruction 25a is written into the file 25.

In step S403, which follows step S402, it is judged as to whether or not a "reply. job" file 26 has been created in the memory card 424. If it is judged that the "reply. job" file 26 has been created, the operation proceeds to step S404 to reference the "reply. job" file 26. As described earlier, the "reply. job" file 26 is created by the PC 20. In the file 26, the number of transfers 26b and a "finish" instruction 26a indicating that all image files 45 assigned with the filenames 48 recorded in the list file 47 have been transferred are recorded. It is to be noted that immediately after the "reply. job" file 26 is created, "1/2" indicating that one of the two image files to be transferred is being transferred is recorded as the transfer number 26b.

In step S405 which follows step S404, it is judged as to whether or not the "finish" instruction 26a has been recorded in the "reply. job" file 26. The operation proceeds to step S406 if it is judged that the "finish" instruction 26a has been recorded, whereas the operation proceeds to step S409 if it is judged that the "finish" instruction 26a has not been recorded yet. In step S409, the display at the display LCD 3 is updated in conformance to the contents recorded in the "reply. job" file 26.

A more detailed explanation is given in reference to FIG. 4. The transfer number 26b indicating the value "1/2" is recorded in the "reply. job" file 26 while the first image file 45 (with the filename "DSCN0002.jpeg") is being transferred, whereas the transfer number 26b indicating the value "2/2" is recorded while the second image file 45 (with the filename "DSCN0004.jpeg") is being transferred.

Figure 18B:
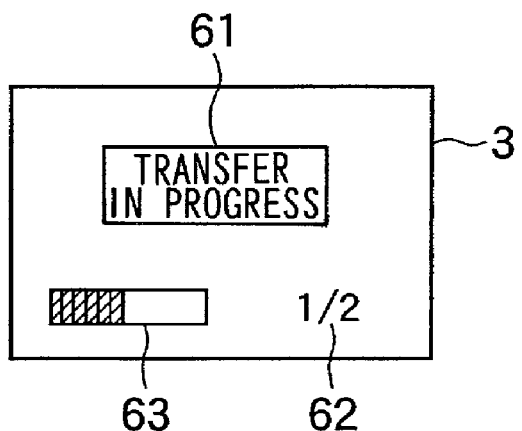

While the transfer of the first image file 45 is in progress, indicators 61, 62 and 63 are brought up on display at the display LCD 3, as shown in FIG. 18B. The indicator 61 indicates that an image file is being transferred and the indicator 62 indicates specifically which image file is being transferred. The indicator 63 is a bar graph of the transfer progress status. When the transfer of the second image file 45 is completed, the "finish" instruction 26a mentioned earlier is recorded.

If, on the other hand, the operation proceeds from step S405 to step S406, the "order. job" file 25 in the memory card 424 is deleted in step S406. Once the "order. job" file 25 is deleted, the operation proceeds to step S407. Instep S407, it is judged as to whether or not the PC 20 has deleted the "reply. job" file 26. If it is judged that the "reply. job" file 26 has been deleted, the operation proceeds to step S408, whereas if it is judged that the "reply. job" file 26 has not been deleted yet, the operation remains in step S407 in standby until the file is deleted.

Figure 18C:
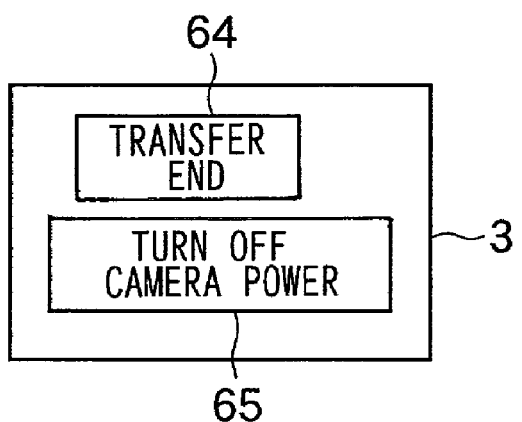

In step S408, indicators 64 and 65 are brought up on display at the display LCD 3 as shown in FIG. 18C. The indicator 64 indicates that all image files 45 assigned with the filenames 48 recorded in the list file 47 have been transferred. The indicator 65 indicates that the power to the electronic camera 1 can now be turned off.

Next, the procedure of the processing executed on the PC side, as shown in FIG. 17, is explained. In step S501, it is judged as to whether or not the "order. job" file 25 has been created in the memory card 424. If it is judged that the file 25 has been created, the operation proceeds to step S502, whereas if it is judged that the file 25 has not been created yet, the operation remains in step S501 in standby until the file is created. In step S502, the "reply. job" file 26 is created in the memory card 424 in response to the "transfer" instruction 25a in the "order. job" file 25. The contents recorded in the "reply. job" file 26 at varying time points during the transfer operation are as explained above.

In step as 503, which follows step S502, one of the image files 45 with their filenames 48 recorded in the list file 47 is transferred to the PC 20. Once one of the image files 45 is transferred, the operation proceeds to step S504. In step S504, it is judged as to whether or not all the image files 45 assigned with filenames 48 recorded in the list file 47 have been transferred. If an affirmative judgement (YES) is made in step S504, the operation proceeds to step S505, whereas if a negative judgement (NO) is made, the operation proceeds to step S508. In step S508, the contents recorded in the "reply. job" file 26 are updated. For instance, if the transfer of the first image file 45 has been completed, the value "1/2" indicating the transfer number 26b is updated to "2/2". When the contents recorded in the "reply. job" file 26 are updated, the operation returns to step S503.

In step S505, the "finish" instruction 26a is written in the "reply. job" file 26. In the following step S506, it is judged as to whether or not the "order. job" file 25 in the memory card 424 has been deleted. If it is judged that the "order. job" file 25 has been deleted, the operation proceeds to step S507, whereas if it is judged that the "order. job" file 25 has not been deleted yet, the operation remains in step S506 in standby until the file is deleted. In step S507, the "reply. job" file 26 is deleted from the memory card 424.

In the processing in the flowcharts presented in FIGS. 16 and 17, the display shown in FIG. 18C is brought up at the display LCD 3 when the transfer has been completed to inform the user that the power to the electronic camera 1 may now be turned off. For this reason, even when processing other than the transfer processing is still in progress on the PC side, the user can be informed that the image transfer has been completed and at the same time, since the user is prompted to turn off the power to the electronic camera 1, wasteful consumption of the battery 456 can be prevented. In addition, even when the user is an inexperienced novice in handling electronic cameras or personal computers and thus does not know the correct timing with which the power to the electronic camera 1 may be turned off, the user prompted by the display shown in FIG. 18C can turn off the power without worrying.

It is to be noted that while the indicator 65 on display indicates that the power to the camera may be turned off in the example presented in FIG. 18C, the indicator 65 does not need to be displayed if an AC adapter is utilized since the power in the battery 465 is not wastefully consumed in such a case.

Figure 19:
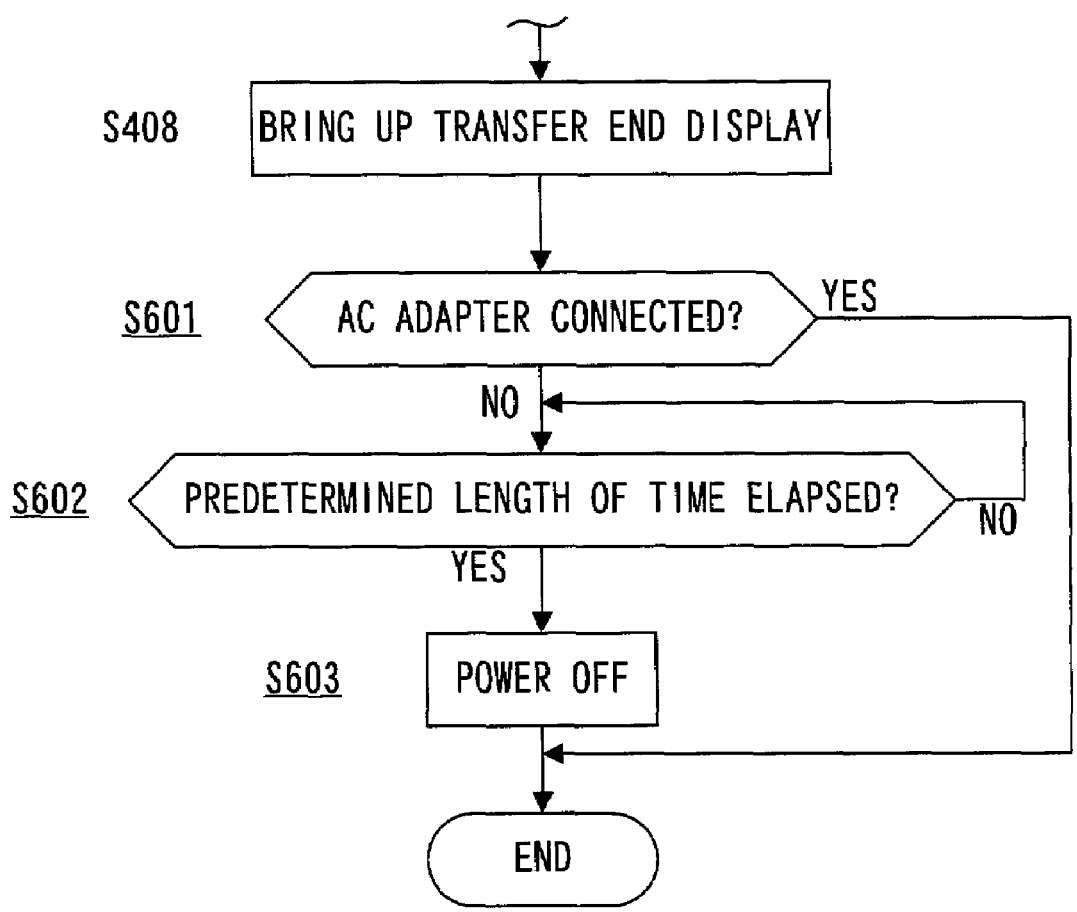
FIG. 19 presents a flowchart of the processing procedure achieved as a variation of the processing shown in FIG. 16.

FIG. 19 presents an example of variation of the processing in the flowchart in FIG. 16, in which processing in steps S601~S603 is implemented after the processing in step S408 in FIG. 16. When the display shown in FIG. 18C is brought up in step S408, the operation proceeds to step S601. In step S601, it is judged as to whether or not an AC adapter is connected to the external power connector terminal 15 (see FIGS. 13 and 14) of the electronic camera 1. If a negative judgement (NO) is made in step S601, the operation proceeds to step S602, whereas if an affirmative judgement (YES) is made, the processing in the flowchart in FIG. 19 ends.

If no AC adapter is connected, the operation proceeds from step S601 to step S602. In step S602, it is judged as to whether or not a predetermined length of time has elapsed after bringing up the transfer end display. If it is judged in step S602 that the predetermined length of time has elapsed, the operation proceeds to step S603. In step S603, the power to the electronic camera 1 is turned off. Thus, when the AC adapter is not utilized, wasteful consumption of the power in the battery 456 is prevented by turning off the power even if the user himself forgets to turn off the power to the electronic camera 1 after the transfer end display is brought up. It is to be noted that if the AC adapter is utilized, the processing in steps S602 and S603 is skipped and thus, the transfer end display is not brought up and the power is not automatically turned off.

In addition, instead of turning off the power to the electronic camera 1 by sending a signal from the PC 20 to the electronic camera 1, the electronic camera 1 may be set in a low power consumption mode referred to as a sleep mode. In this case, too, wasteful consumption of the power in the battery 456 is prevented. It is to be noted that since the PC 20 implements polling for the electronic camera 1 over predetermined time intervals as long as the USB cable 121 is connected with the PC 20, a setting should be effected to ensure that no polling from the PC 20 is accepted after receiving a signal for setting the electronic camera in the sleep mode.

The above described embodiments are examples, and various modifications can be made without departing from the spirit and scope of the invention. For instance, while image files 45 are transferred through USB communication in the embodiments described above, image files may instead be transferred wirelessly through the Bluetooth method or like. In addition, the present invention may be adopted in PDAs and mobile telephones having an image capturing element and capable of performing data-transfer as well as in electronic cameras.

Furthermore, the electronic camera 1 may include a storage device in which image data obtained through photographing operation are recorded. In such a case, the image data are recorded into the storage device instead of in the memory card 424 and the list file explained earlier is created in the storage device.

Moreover, the transfer end indicator and the indicator that indicates that the power can be turned off may be brought up at the LCD 3 of the electronic camera 1 in the first or the second embodiment after the image data transfer is completed.

What is claimed is:

1. An electronic device, comprising:
   an image-capturing device that captures an image of a subject;
   a recording device that records an image file corresponding to images captured by the image-capturing device into a recording medium;
   a specifying information forming device that forms transfer image specifying information for specifying an image file to be transferred in the recording medium separately from the image file;
   a communication device that transfers the image file recorded in the recording medium to an external recording device;
   a transfer instruction operation unit that issues an instruction for the communication device to transfer the image file specified with the transfer image specifying information; and
   a processing device that processes the image file that is specified with the transfer image specifying information differently from an image file that is not specified with the transfer image specifying information, wherein
   the processing executed by the processing device is deletion of image files recorded in the recording medium; and
   the processing device deletes only image files that are not specified with transfer image specifying information when the deletion of image files is instructed.

2. An electronic device according to claim 1, further comprising:
   a specifying information deleting device that deletes the transfer image specifying information from the recording medium after the communication device transfers the image file specified with the transfer image specifying information.

3. An electronic device according to claim 1, further comprising:
   an image displaying device that displays at least one of photographic images based upon an image file recorded in the recording medium in response to a reproduction instruction, wherein:
   the specifying information forming device is configured to form transfer image specifying information for an image file corresponding to at least one of a photographic image displayed on the image displaying device.

4. An electronic device according to claim 1, further comprising:
   a display device that displays a mark indicating a transfer end once an image file transfer is completed.

5. An electronic device according to claim 1, further comprising:
   a display device that displays a mark indicating that power to the electronic device can now be turned off once the image file has been transferred.

6. An electronic device according to claim 1, further comprising:
   an operating member that is operated by a user to instruct the specifying information forming device so as to form the specifying information, wherein:
   the specifying information forming device is configured to form the transfer image specifying information for an image file based on operation of the operating member.

7. An electronic device according to claim 1, further comprising:
   an image displaying device that displays photographic image, and
   an operating member that is operated by a user to instruct the specifying information forming device so as to form the transfer image specifying information, wherein
   the specifying information forming device is configured to, when the operating member is operated, set the transfer image specifying information to an image file corresponding to a photographic image displayed on the image displaying device immediately after the photographic image is produced on the basis of a captured image by the image-capturing device.

8. An electronic device according to claim 1, further comprising:
   an image displaying device that displays photographic image based upon an image file recorded in the recording medium in response to a reproduction instruction, and
   an operating member that is operated by a user to instruct the specifying information forming device so as to form the transfer image specifying information, wherein
   the specifying information forming device is configured to set the transfer image specifying information to an image file, when the operating member is operated while the photographic image corresponding to the image file having read out from the recording medium is reproduced and displayed on the image displaying device.

9. An electronic device according to claim 1, further comprising:
an image displaying device that displays photographic images based upon image files recorded in the recording medium in response to a reproduction instruction, and
an operating member that is operated by a user to instruct the specifying information forming device so as to form the transfer image specifying information, wherein
the specifying information forming device is configured to set the transfer image specifying information to the image file corresponding to a photographic image selected among a plurality of photographic images displayed on the image displaying device, when the operating member is operated while the plurality of photographic images are displayed as a thumbnail image.

10. An electronic device according to claim 1, further comprising:
an operating member that is operated by a user to instruct the specifying information forming device so as to form the transfer image specifying information every time the image file is recorded in the recording medium, wherein
the specifying information forming device is configured to set the transfer image specifying information to an image file at every photographic operation after the operating member is operated.

11. An electronic device according to claim 1, wherein the specifying information forming device is configured to set the transfer image specifying information to all image files recorded in the recording medium.

12. An electronic device, comprising:
an image-capturing device that captures an image of a subject;
a recording device that records an image file of images captured by the image-capturing device into a recording medium;
a specifying information forming device that forms transfer image specifying information for specifying an image file to be transferred as tag information in the image file;
a communication device that transfers the image file recorded in the recording medium to an external recording device;
a transfer instruction operation unit that issues an instruction for the communication device to transfer the image file specified with the transfer image specifying information; and
a processing device that processes the image file that is specified with the transfer image specifying information differently from an image file that is not specified with the transfer image specifying information, wherein
the processing executed by the processing device is deletion of image files recorded in the recording medium; and
the processing device deletes only image files that are not specified with transfer image specifying information when the deletion of image files is instructed.

13. An electronic device according to claim 12, further comprising:
a specifying information deleting device that deletes the tag information from an image file specified with the transfer image specifying information after the communication device transfers the image file.

14. An electronic device according to claim 12, further comprising:
an image reproducing device that reproduces photographic images based upon an image file recorded in the recording medium, wherein:
the specifying information forming device forms transfer image specifying information for an image file corresponding to a photographic image reproduced by the image reproducing device.

15. An electronic device according to claim 12, further comprising:
a display device that displays a mark indicating a transfer end once an image file transfer is completed.

16. An electronic device according to claim 12, further comprising:
a display device that displays a mark indicating that power to the electronic device can now be turned off once the image file has been transferred.

17. An electronic device according to claim 12, wherein:
the specifying information forming device forms the transfer image specifying information for an image file during a period of time elapsing after the image is captured by the image-capturing device until the recording of the image file into the recording medium is completed.

18. An electronic device according to claim 12, further comprising:
an image displaying device that displays photographic image, and
an operating member that is operated by a user to instruct the specifying information forming device so as to form the transfer image specifying information, wherein
the specifying information forming device is configured to, when the operating member is operated, set the transfer image specifying information to an image file corresponding to a photographic image displayed on the image displaying device immediately after the photographic image is produced on the basis of a captured image by the image-capturing device.

19. An electronic device according to claim 12, further comprising:
an image displaying device that displays photographic image based upon an image file recorded in the recording medium in response to a reproduction instruction, and
an operating member that is operated by a user to instruct the specifying information forming device so as to form the transfer image specifying information, wherein
the specifying information forming device is configured to set the transfer image specifying information to an image file, when the operating member is operated while the photographic image corresponding to the image file having read out from the recording medium is reproduced and displayed on the image displaying device.

20. An electronic device according to claim 12, further comprising:
an image displaying device that displays photographic images based upon image files recorded in the recording medium in response to a reproduction instruction, and
an operating member that is operated by a user to instruct the specifying information forming device so as to form the transfer image specifying information, wherein
the specifying information forming device is configured to set the transfer image specifying information to the image file corresponding to a photographic image selected among a plurality of photographic images displayed on the image displaying device, when the operating member is operated while the plurality of photographic images are displayed as a thumbnail image.

21. An electronic device according to claim 12, further comprising:
an operating member that is operated by a user to instruct the specifying information forming device so as to form the transfer image specifying information every time the image file is recorded in the recording medium, wherein
the specifying information forming device is configured to set the transfer image specifying information to an image file at every photographic operation after the operating member is operated.

22. An electronic device according to claim 12, wherein the specifying information forming device is configured to set the transfer image specifying information to all image files recorded in the recording medium.

23. An electronic system, comprising:
an electronic device according to claim 1; and
an external recording device to which image files recorded in the recording medium used for the electronic device are transferred, wherein:
an image file transfer to the external recording device from the recording medium starts in response to an instruction issued through the transfer instruction operation unit.

24. An electronic device, comprising:
an image-capturing device that captures an image of a subject;
a recording device that records an image file corresponding to the image captured by the image-capturing device into a recording medium;
a communication device that transfers the image file recorded in the recording medium to an external recording device;
a transfer instruction operation unit that issues an instruction for the communication device to transfer the image file;
a display device that displays a transfer mark indicating that the image file is being transferred while an image file transfer is in progress and changes the display to display a transfer end mark after the image file transfer is completed;
an external power connector terminal that is provided to connect the electronic device and an external power source;
a judging device that judges whether the external power source is connected via the external power connector terminal to the electronic device; and
a power control device that turns off the power to the electronic device after a predetermined length of time elapses following transfer end if the judging device judges that the external power source is not connected to the electronic device, and does not turn off the power to the electronic device even after the predetermined length of time elapses following the transfer end if the judging device judges that the external power source is connected to the electronic device, wherein
the power control device includes a transfer end confirmation device that confirms the transfer end by information received from the external recording device, and
the information received from the external recording device comprises a text file in which a message of the transfer end is described, the text file being recorded into the recording medium by the recording device.

25. An electronic device according to claim 24, wherein:
the display device displays the transfer end mark when the external recording device instructs that the image file transfer is completed.

26. An electronic device, comprising:
an image-capturing device that captures an image of a subject;
a recording device that records an image file corresponding to images captured by the image-capturing device into a recording medium;
a communication device that transfers the image file recorded in the recording medium to an external recording device;
a transfer instruction operation unit that issues an instruction for the communication device to transfer the image file; and
a display device that, once an image file transfer is completed, displays a mark before a power off command, wherein the mark displays a message indicating that power to the electronic device can now be turned off.

27. An electronic device according to claim 26, further comprising:
an internal drive battery.

28. An electronic device according to claim 27 further comprising:
an external power connector terminal that can be connected with an external power source;
a judging device that judges as to whether or not the external power source is connected to the external power connector terminal; and
a control device that allows the mark to be displayed at the display device if the judging device judges that the external power source is not connected and disallows display of the mark at the display device if the judging device judges that the external power source is connected.

29. An electronic system, comprising:
an external recording device having an information input device;
an electronic device capable of working in a low power consumption mode, that includes;
an image-capturing device that captures an image of a subject;
a recording device that records an image file corresponding to images captured by the image-capturing device into a recording medium;
an information output device capable of outputting to the outside the image file recorded in the recording medium;
an external power connector terminal that is provided to connect the electronic device and an external power source;
a judging device that judges whether the external power source is connected via the external power connector terminal to the electronic device;
a transfer instruction operation unit that issues an instruction for the image file to be transmitted via the information output device, and
a transmission device that transmits the image file from the information output device to the information input device, wherein
an image file transfer from the electronic device to the external recording device via the transmission device is started in response to the instruction issued through the transfer instruction operation unit, and the electronic device is set in the low power consumption mode in response to an instruction issued from the external recording device via the transmission device when the image file transfer is completed if the judging device judges that the external power source is not connected to the electronic device, and the electronic device is not set in the low power consumption mode even when the instruction is issued from the external recording device in response to image file transfer completion if the judging device judges that the external power source is connected to the electronic device.

* * * * *